United States Patent
Varier et al.

(10) Patent No.: US 7,599,283 B1
(45) Date of Patent: Oct. 6, 2009

(54) NETWORK TRAFFIC SYNCHRONIZATION AND DATA COMPRESSION IN REDUNDANT NETWORK TOPOLOGIES

(75) Inventors: Roopesh R. Varier, Sunnyvale, CA (US); James J. Stabile, Los Altos, CA (US); Paul Leslie Archard, Kelowna (CA); Guy Riddle, Los Gatos, CA (US); David Jacobson, Durham, NC (US)

(73) Assignee: Packeteer, Inc., Cupertino, CA (US)

( * ) Notice: Subject to any disclaimer, the term of this patent is extended or adjusted under 35 U.S.C. 154(b) by 975 days.

(21) Appl. No.: 10/858,340

(22) Filed: Jun. 1, 2004

Related U.S. Application Data

(63) Continuation-in-part of application No. 10/611,573, filed on Jun. 30, 2003.

(51) Int. Cl.
| | |
|---|---|
| *G01R 31/08* | (2006.01) |
| *H04L 12/28* | (2006.01) |
| *H04L 12/26* | (2006.01) |
| *H04J 3/18* | (2006.01) |
| *G06F 15/173* | (2006.01) |

(52) U.S. Cl. .................. 370/216; 370/235; 370/254; 370/477; 709/223

(58) Field of Classification Search ............... 370/216, 370/235, 254, 477; 709/223–224
See application file for complete search history.

(56) References Cited

U.S. PATENT DOCUMENTS

| 6,011,776 A | 1/2000 | Berthaud et al. |
|---|---|---|
| 6,128,713 A | 10/2000 | Eisler et al. |
| 6,154,776 A | 11/2000 | Martin |
| 6,195,362 B1 | 2/2001 | Darcie et al. |
| 6,366,945 B1 | 4/2002 | Fong et al. |
| 6,490,249 B1 | 12/2002 | Aboul-Madg et al. |
| 6,546,415 B1 | 4/2003 | Park |
| 6,771,661 B1 | 8/2004 | Chawla et al. |
| 6,952,735 B1 | 10/2005 | Aune |
| 6,968,323 B1 | 11/2005 | Bansal et al. |
| 7,366,101 B1 | 4/2008 | Varier et al. |
| 2002/0038385 A1* | 3/2002 | Kalliokulju ............... 709/247 |
| 2002/0073226 A1* | 6/2002 | Sridhar et al. ............ 709/235 |
| 2002/0167960 A1 | 11/2002 | Garcia-Luna-Aceves |
| 2002/0194326 A1 | 12/2002 | Gold et al. |
| 2003/0043792 A1 | 3/2003 | Carpini et al. |

OTHER PUBLICATIONS

United States Trademark Office; Office Action for U.S. Appl. No. 10/611,573, filed Jun. 20, 2002 in the name of Roopesh R. Varier et al.; 7 pages, Apr. 3, 2007.
United States Trademark Office; Office Action for U.S. Appl. No. 10/611,573, filed Jun. 20, 2002 in the name of Roopesh R. Varier et al.; 6 pages, Oct. 16, 2007.

* cited by examiner

*Primary Examiner*—Kevin C Harper
(74) *Attorney, Agent, or Firm*—Baker Botts L.L.P.

(57) ABSTRACT

Synchronization of network traffic compression mechanisms deployed in redundant network topologies. In one implementation, the present invention features the synchronization of compression statistics on redundant network devices to facilitate failover and load sharing operations in the management of data flows traversing computer network environments. In one implementation, compression meta data is appended to synchronization packets and transmitted to one or more partner or redundant network devices. The receiving network devices use the compression meta data to synchronize one or more data flow control processes or data structures. Implementations of the present invention also feature process flows that increase the efficiency of synchronizing compression related operations.

50 Claims, 18 Drawing Sheets

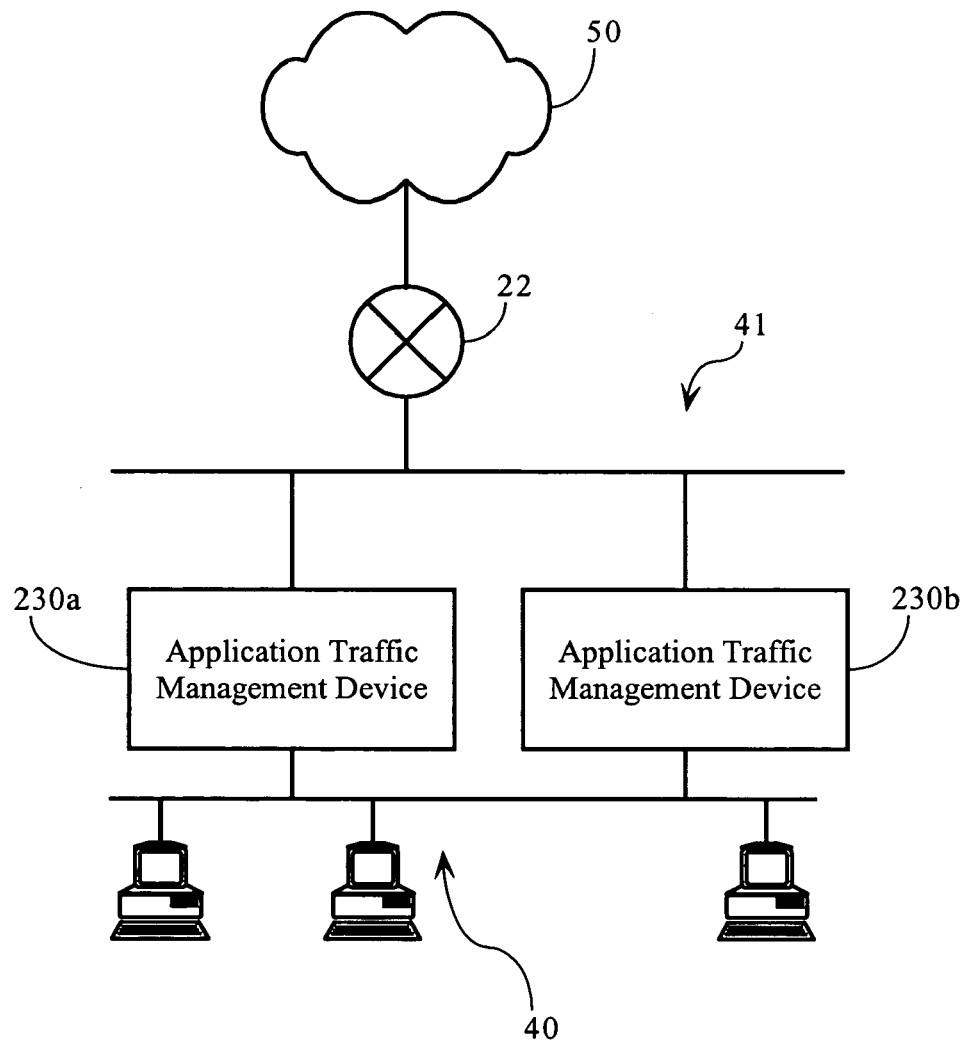
Fig._1B
(Prior Art)

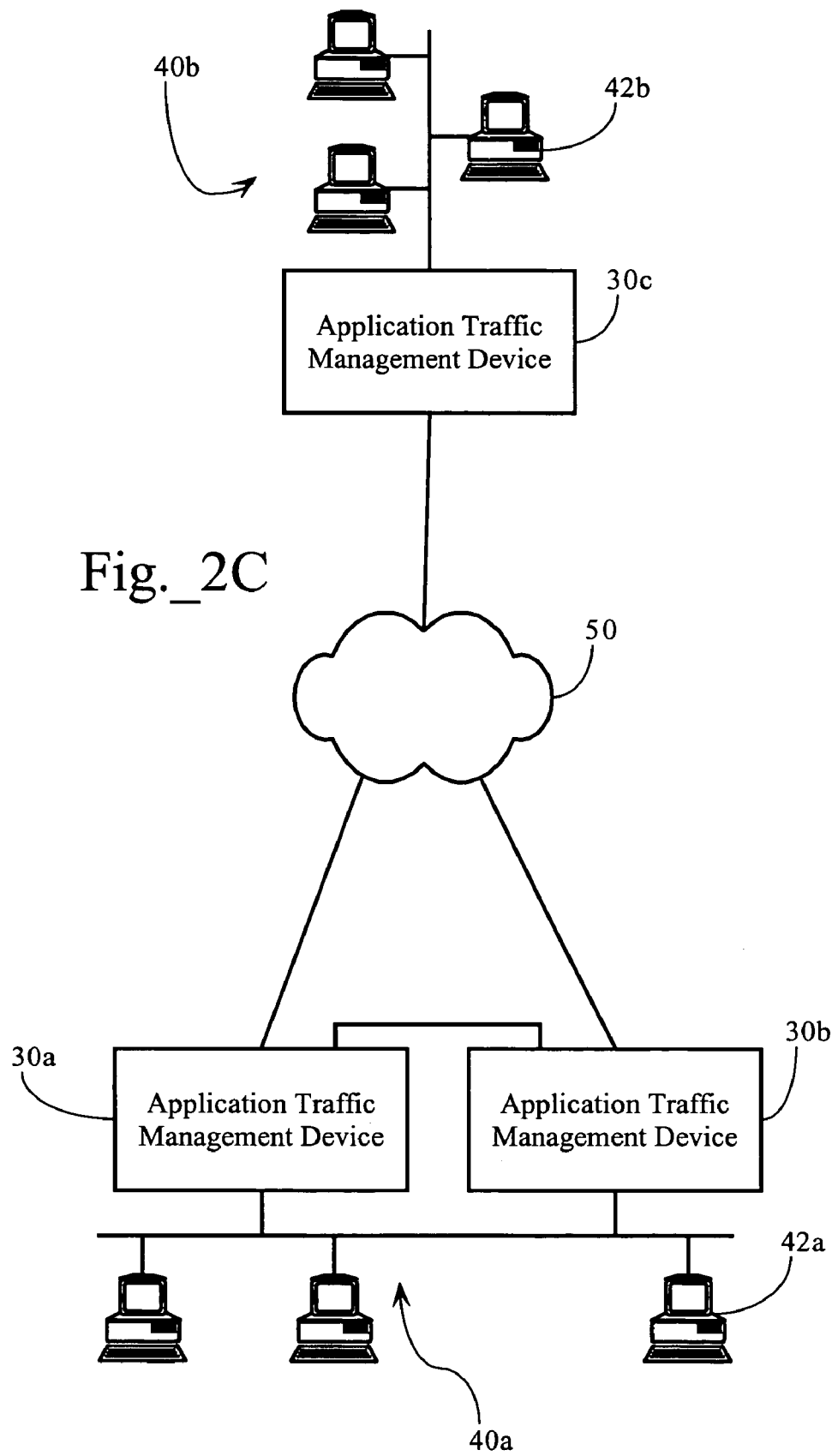
Fig._2C

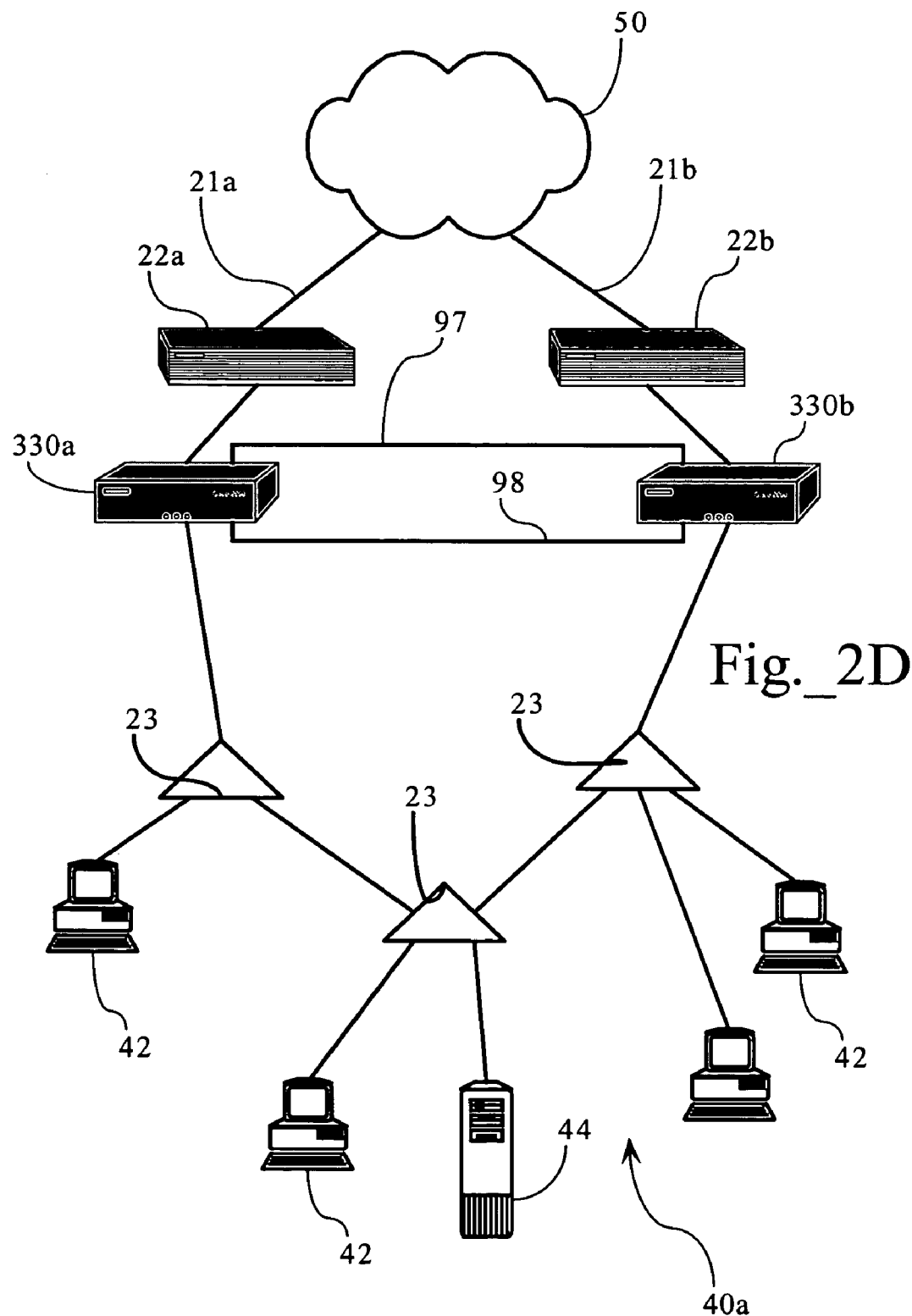
Fig._2D

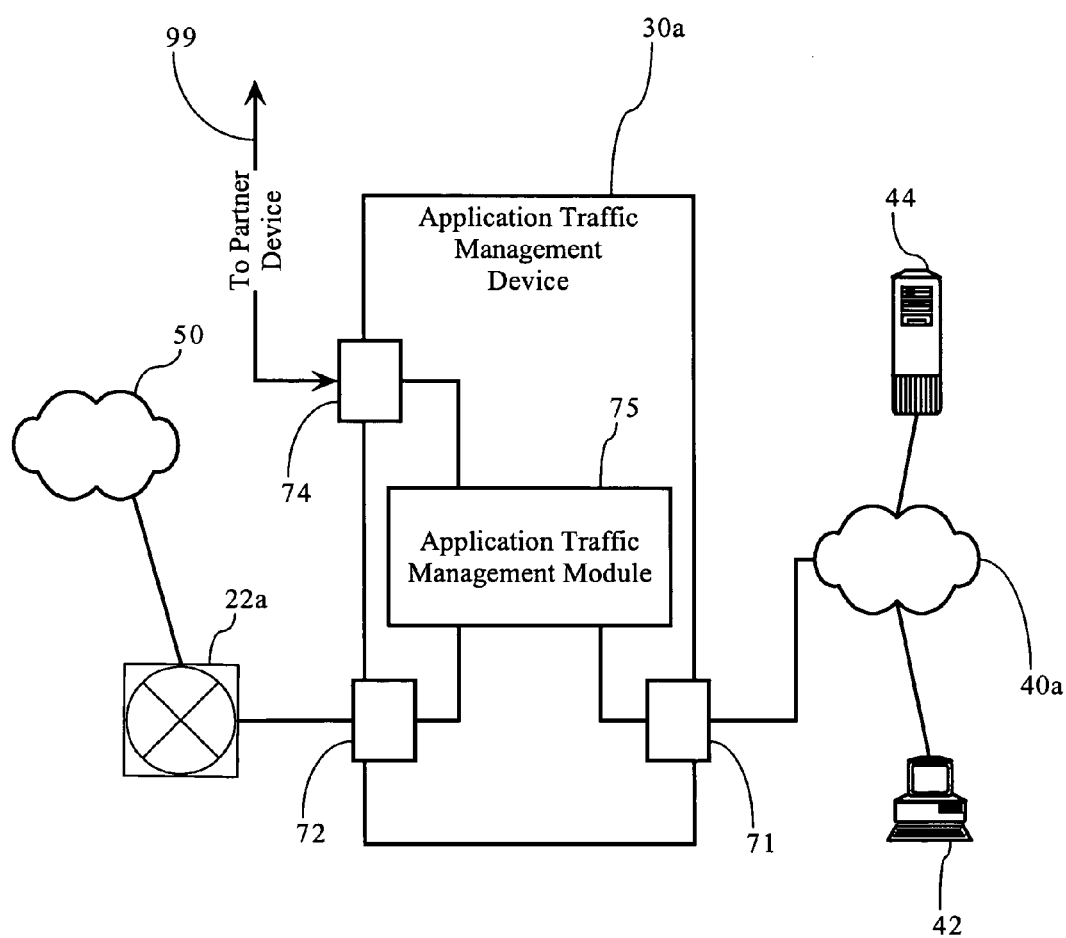
Fig._2E

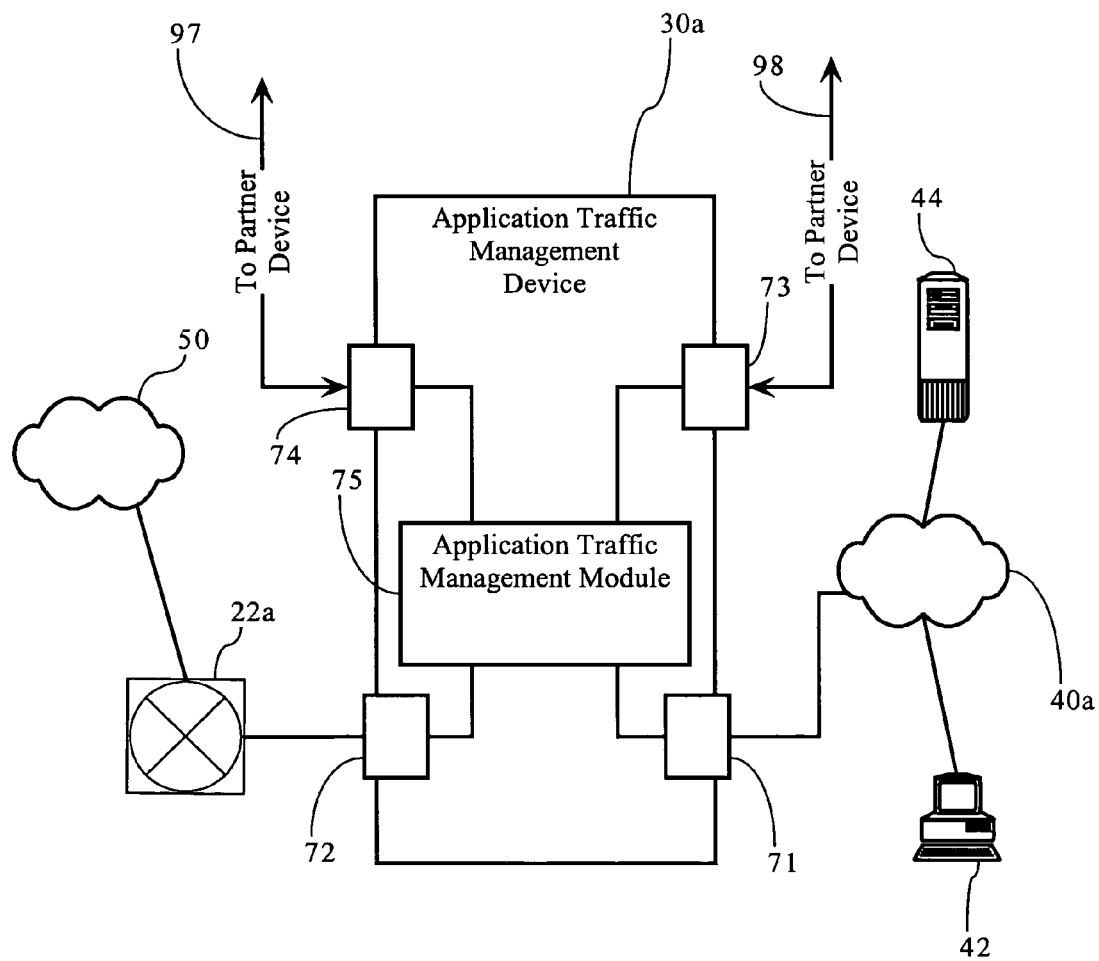
Fig._2F

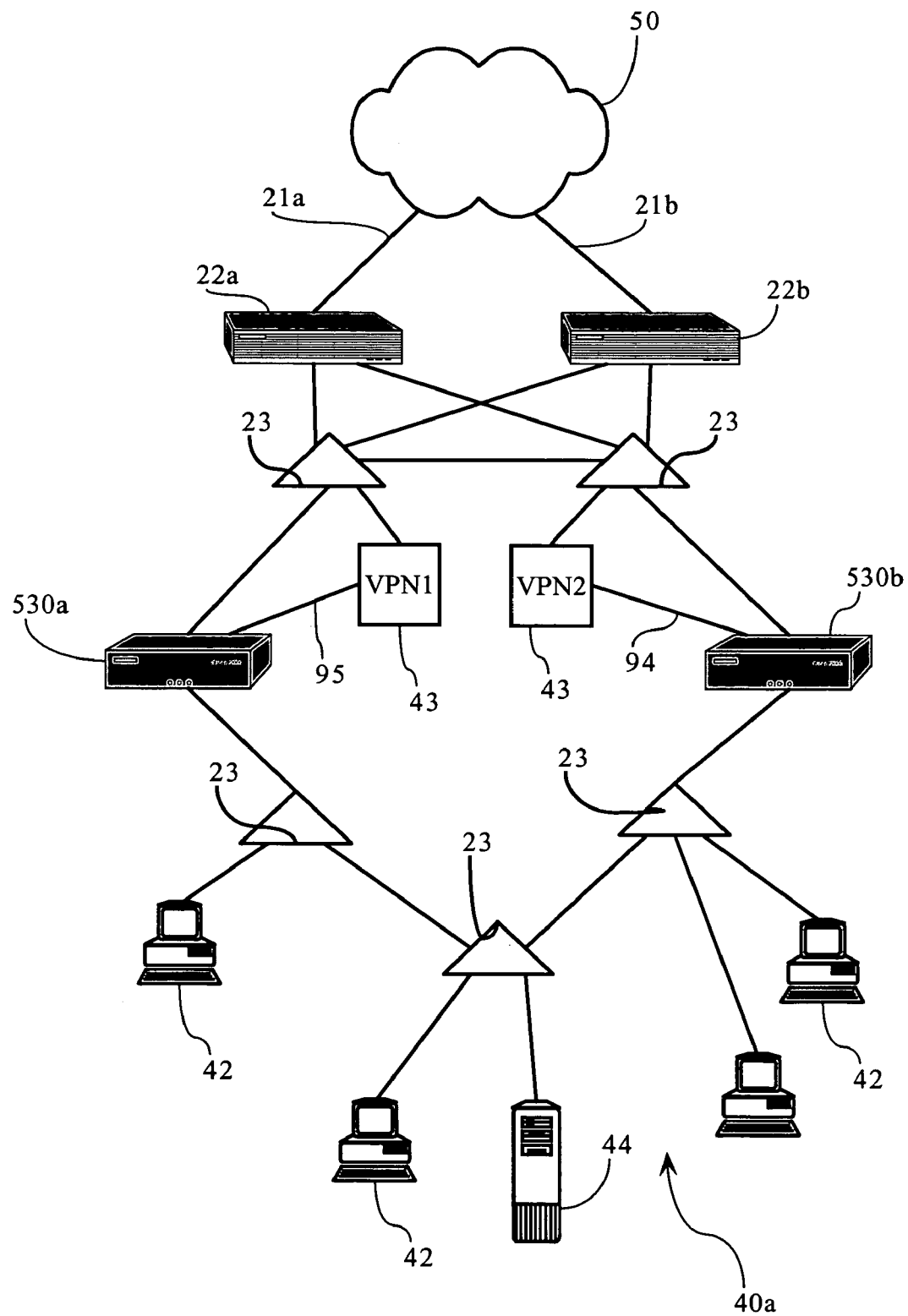
Fig._2H

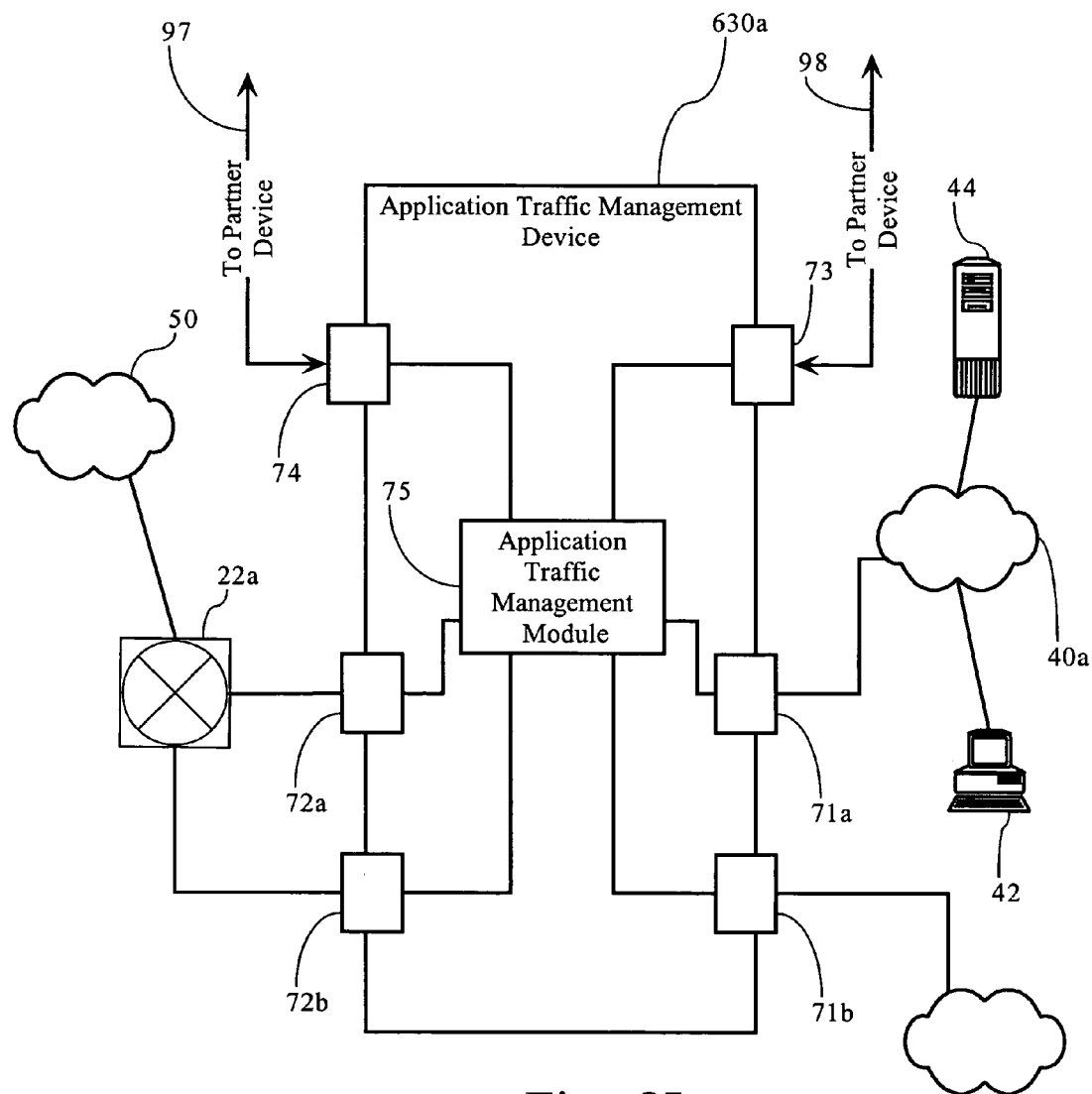
Fig._2I

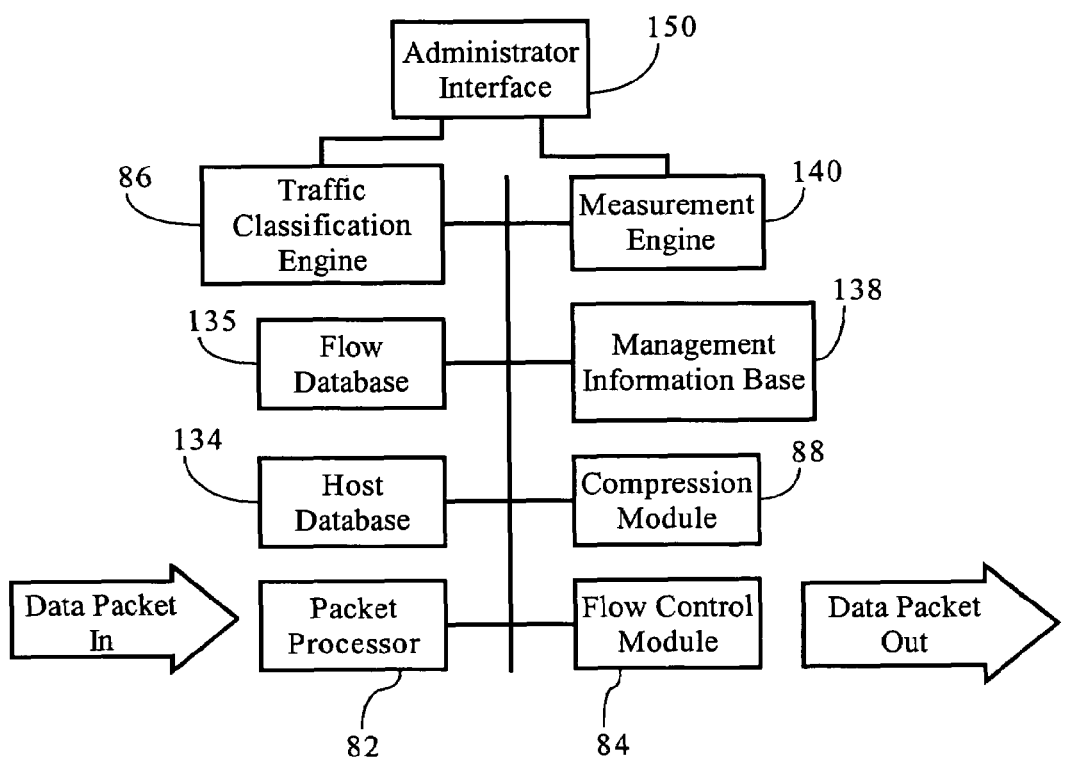
Fig._3

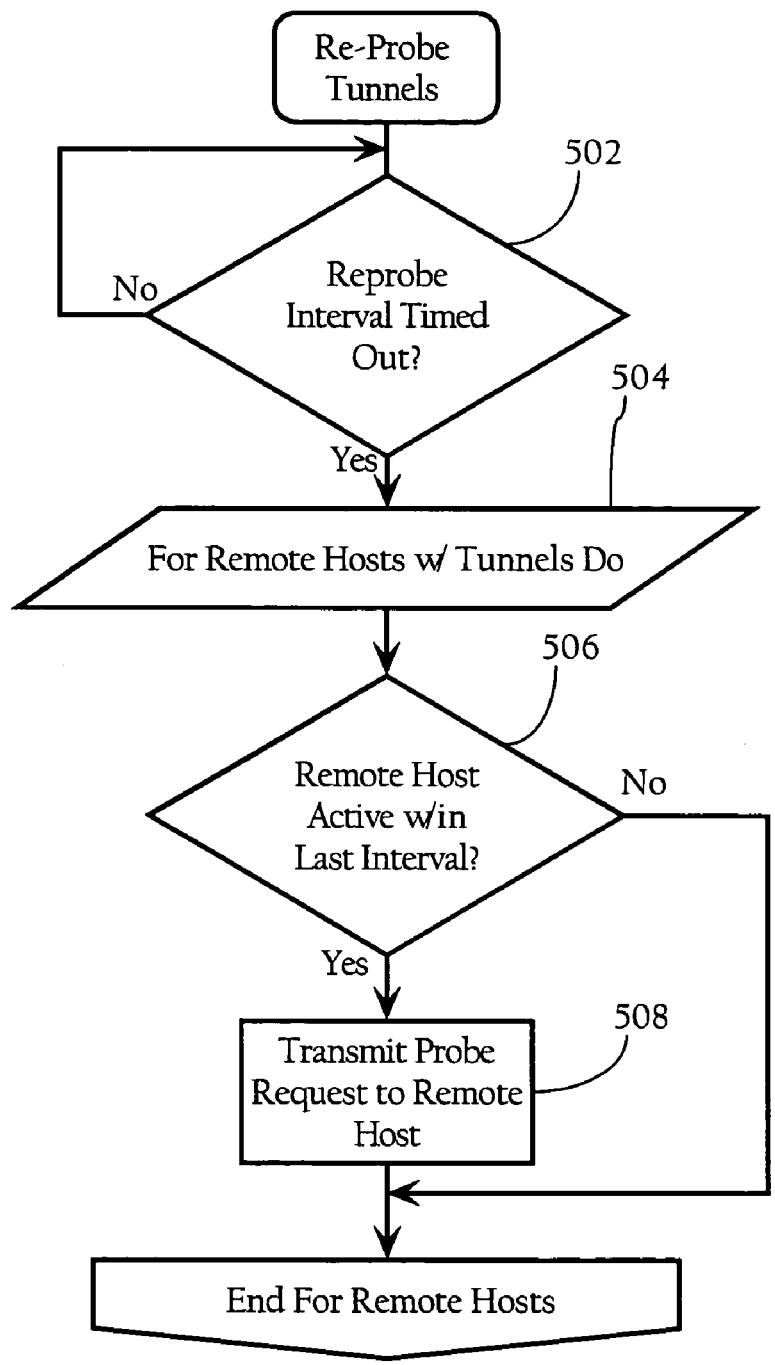
Fig._4

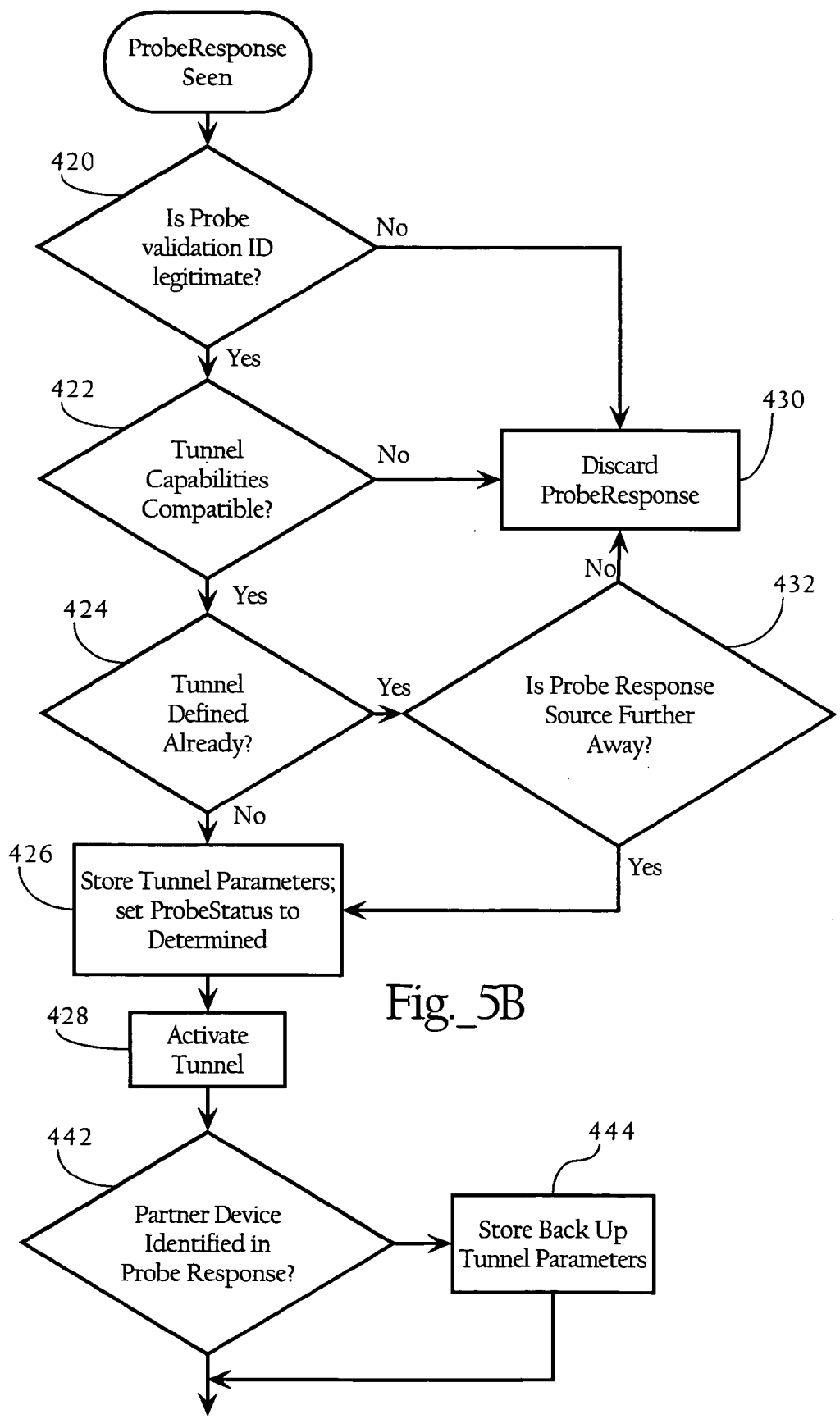
Fig._5B

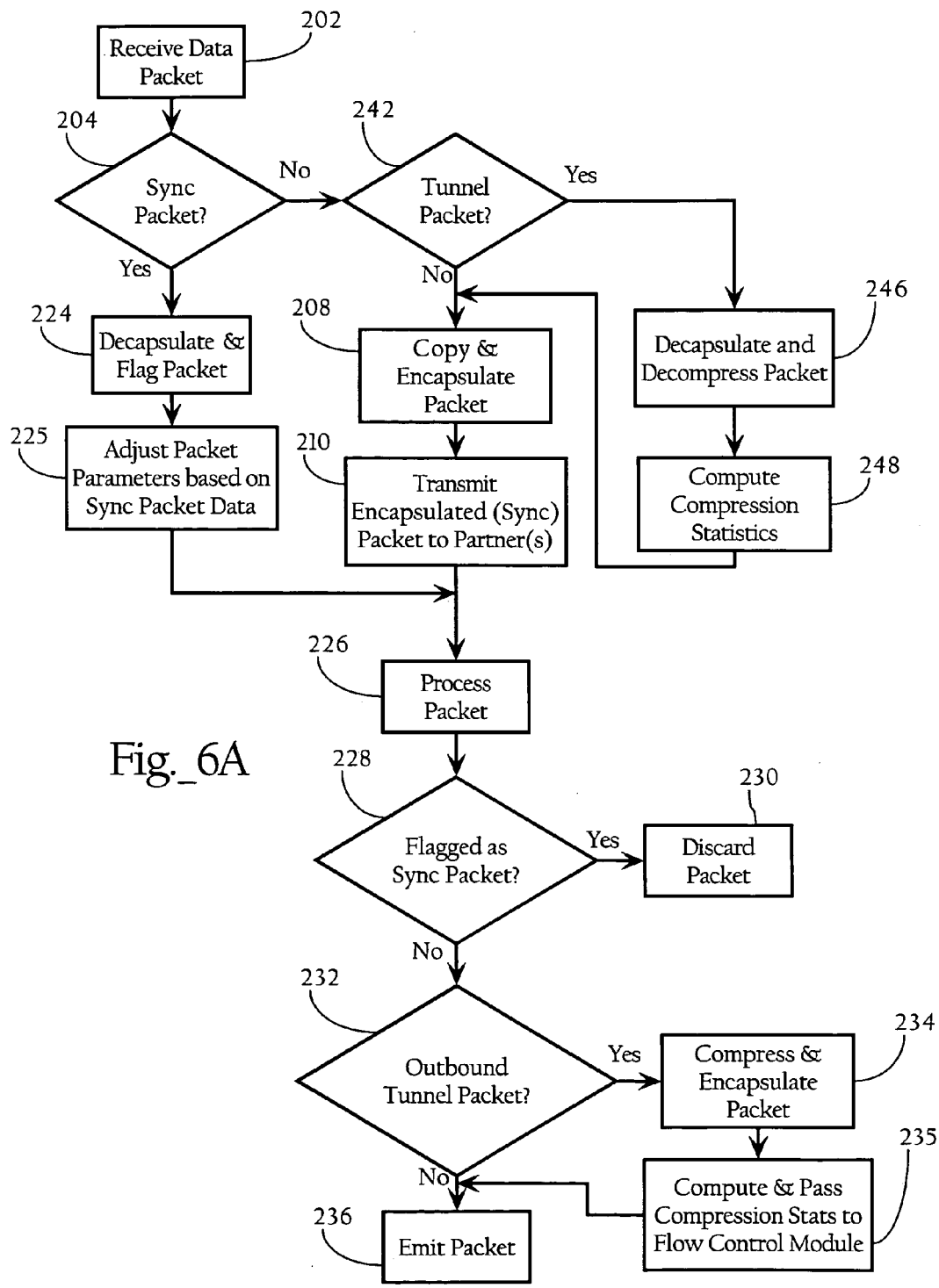
Fig._6A

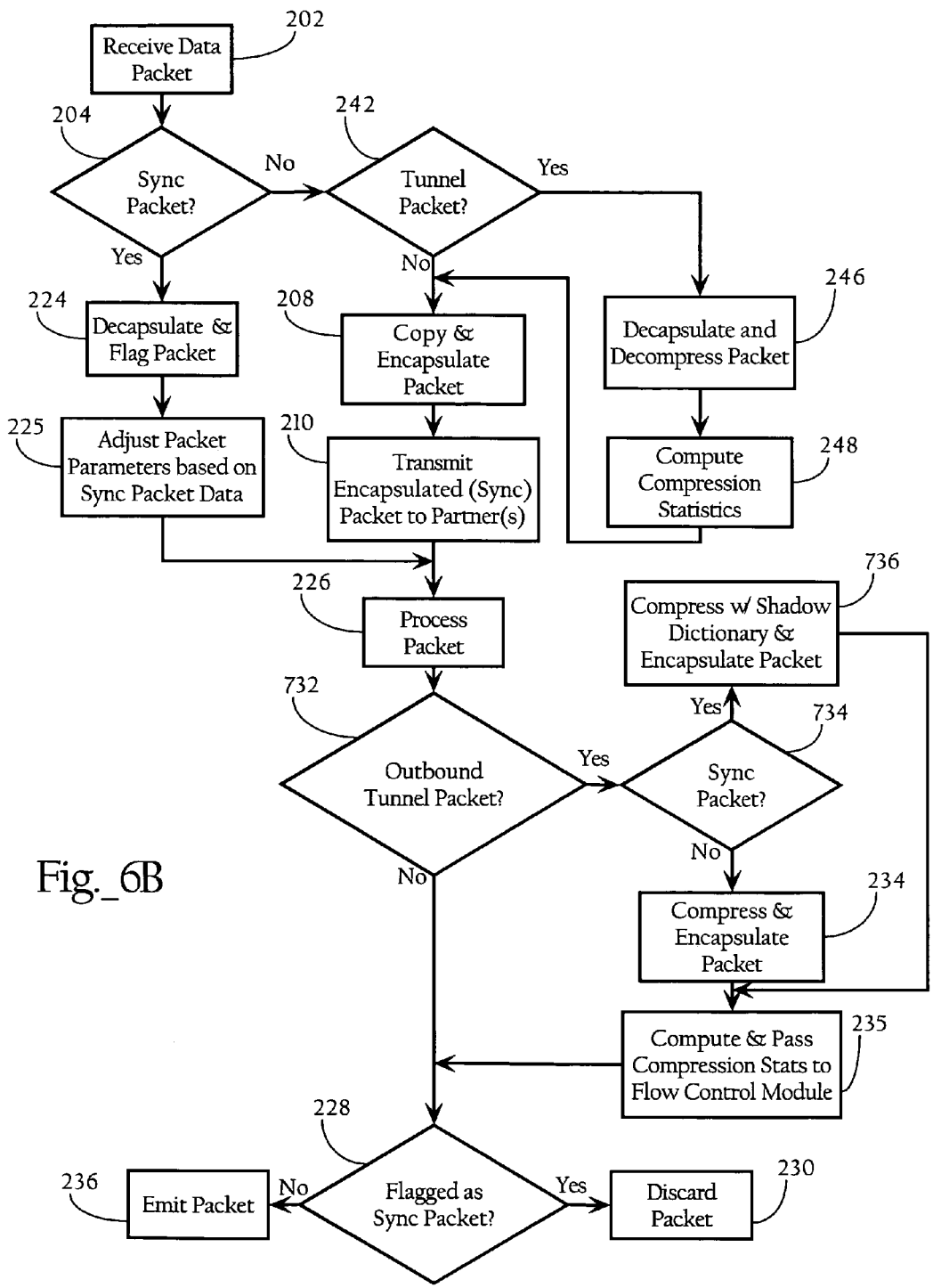
Fig._6B

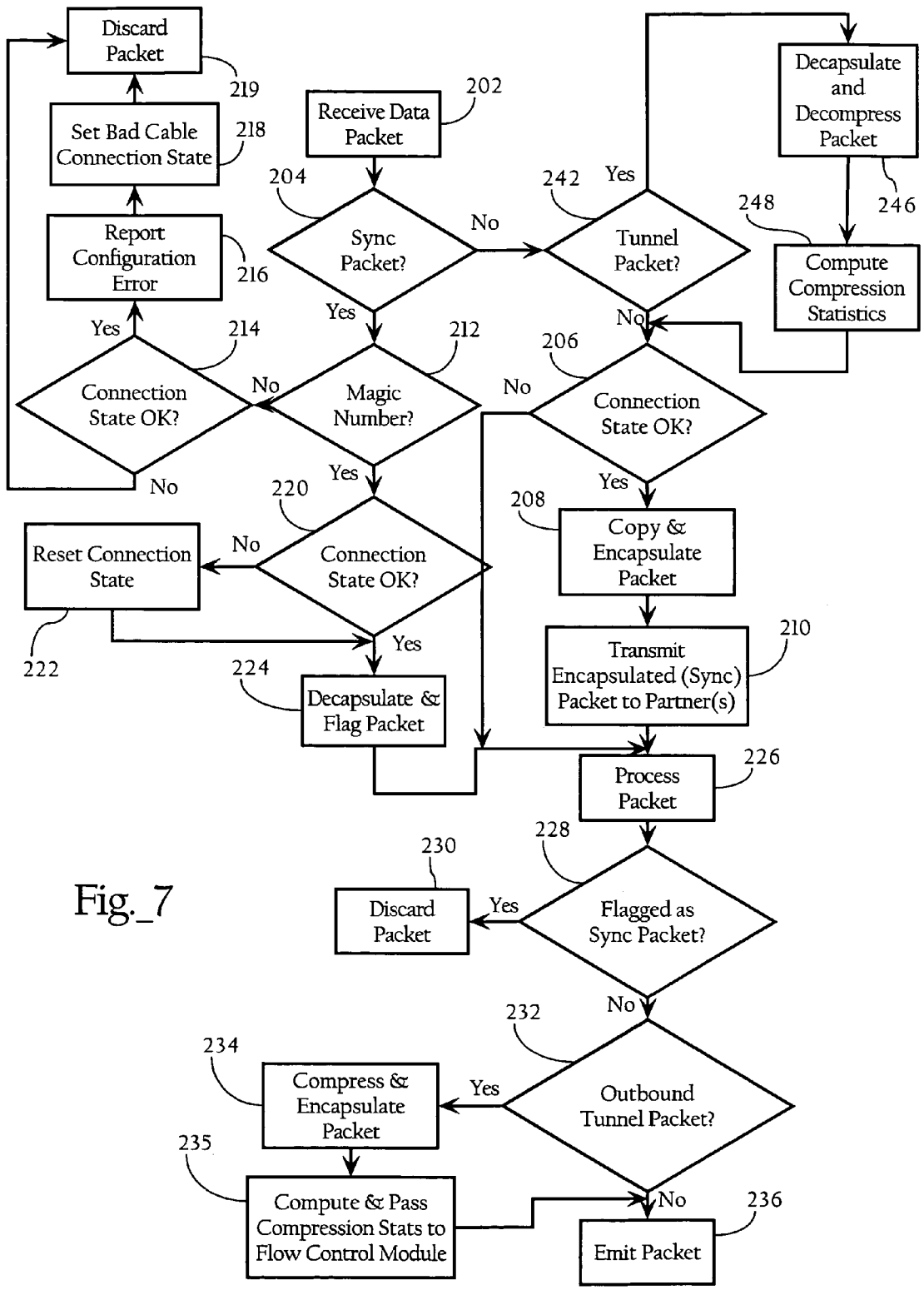
Fig._7

NETWORK TRAFFIC SYNCHRONIZATION AND DATA COMPRESSION IN REDUNDANT NETWORK TOPOLOGIES

CROSS-REFERENCE TO RELATED APPLICATIONS AND PATENTS

The present application is a continuation-in-part of U.S. application Ser. No. 10/611,573 filed Jun. 30, 2003 and entitled "Network Traffic Synchronization Mechanism." This application also makes reference to the following commonly owned U.S. patent applications and patents, which are incorporated herein by reference in their entirety for all purposes:

U.S. patent application Ser. No. 08/762,828 now U.S. Pat. No. 5,802,106 in the name of Robert L. Packer, entitled "Method for Rapid Data Rate Detection in a Packet Communication Environment Without Data Rate Supervision;"

U.S. patent application Ser. No. 08/970,693 now U.S. Pat. No. 6,018,516, in the name of Robert L. Packer, entitled "Method for Minimizing Unneeded Retransmission of Packets in a Packet Communication Environment Supporting a Plurality of Data Link Rates;"

U.S. patent application Ser. No. 08/742,994 now U.S. Pat. No. 6,038,216, in the name of Robert L. Packer, entitled "Method for Explicit Data Rate Control in a Packet Communication Environment without Data Rate Supervision;"

U.S. patent application Ser. No. 09/977,642 now U.S. Pat. No. 6,046,980, in the name of Robert L. Packer, entitled "System for Managing Flow Bandwidth Utilization at Network, Transport and Application Layers in Store and Forward Network;"

U.S. patent application Ser. No. 09/106,924 now U.S. Pat. No. 6,115,357, in the name of Robert L. Packer and Brett D. Galloway, entitled "Method for Pacing Data Flow in a Packet-based Network;"

U.S. patent application Ser. No. 09/046,776 now U.S. Pat. No. 6,205,120, in the name of Robert L. Packer and Guy Riddle, entitled "Method for Transparently Determining and Setting an Optimal Minimum Required TCP Window Size;"

U.S. patent application Ser. No. 09/479,356 now U.S. Pat. No. 6,285,658, in the name of Robert L. Packer, entitled "System for Managing Flow Bandwidth Utilization at Network, Transport and Application Layers in Store and Forward Network;"

U.S. patent application Ser. No. 09/198,090 now U.S. Pat. No. 6,412,000, in the name of Guy Riddle and Robert L. Packer, entitled "Method for Automatically Classifying Traffic in a Packet Communications Network;"

U.S. patent application Ser. No. 09/198,051, in the name of Guy Riddle, entitled "Method for Automatically Determining a Traffic Policy in a Packet Communications Network;"

U.S. patent application Ser. No. 09/206,772, in the name of Robert L. Packer, Brett D. Galloway and Ted Thi, entitled "Method for Data Rate Control for Heterogeneous or Peer Internetworking;"

U.S. patent application Ser. No. 09/710,442, in the name of Todd Krautkremer and Guy Riddle, entitled "Application Service Level Mediation and Method of Using the Same;"

U.S. patent application Ser. No. 10/015,826 in the name of Guy Riddle, entitled "Dynamic Tunnel Probing in a Communications Network;"

U.S. patent application Ser. No. 10/039,992, in the name of Michael J. Quinn and Mary L. Laier, entitled "Method and Apparatus for Fast Lookup of Related Classification Entities in a Tree-Ordered Classification Hierarchy;"

U.S. patent application Ser. No. 10/099,629 in the name of Brett Galloway, Mark Hill, and Anne Cesa Klein, entitled "Method And System For Controlling Network Traffic Within The Same Connection With Different Packet Tags By Varying The Policies Applied To A Connection;"

U.S. patent application Ser. No. 10/108,085, in the name of Wei-Lung Lai, Jon Eric Okholm, and Michael J. Quinn, entitled "Output Scheduling Data Structure Facilitating Hierarchical Network Resource Allocation Scheme;"

U.S. patent application Ser. No. 10/155,936 now U.S. Pat. No. 6,591,299, in the name of Guy Riddle, Robert L. Packer, and Mark Hill, entitled "Method For Automatically Classifying Traffic With Enhanced Hierarchy In A Packet Communications Network;"

U.S. patent application Ser. No. 10/236,149, in the name of Brett Galloway and George Powers, entitled "Classification Data Structure enabling Multi-Dimensional Network Traffic Classification and Control Schemes;"

U.S. patent application Ser. No. 10/453,345, in the name of Scott Hankins, Michael R. Morford, and Michael J. Quinn, entitled "Flow-Based Packet Capture;"

U.S. patent application Ser. No. 10/676,632, in the name of Roopesh Varier, Guy Riddle, and David Jacobson, entitled "Dynamic Bandwidth Management Responsive to Access Link State in Redundant Network Topologies;" and U.S. patent application Ser. No. 10/810,785 in the name of Azeem Feroz, Wei-Lung Lai, and Jim Stabile, entitled "Slow-Start Adaptive Mechanisms to Improve Efficiency of Bandwidth Allocation."

FIELD OF THE INVENTION

The present invention relates to computer networks and, more particularly, to methods, apparatuses and systems directed to the operation of network traffic compression mechanisms deployed in redundant network topologies.

BACKGROUND OF THE INVENTION

Efficient allocation of network resources, such as available network bandwidth, has become critical as enterprises increase reliance on distributed computing environments and wide area computer networks to accomplish critical tasks. The widely-used TCP/IP protocol suite, which implements the world-wide data communications network environment called the Internet and is employed in many local area networks, omits any explicit supervisory function over the rate of data transport over the various devices that comprise the network. While there are certain perceived advantages, this characteristic has the consequence of juxtaposing very high-speed packets and very low-speed packets in potential conflict and produces certain inefficiencies. Certain loading conditions degrade performance of networked applications and can even cause instabilities which could lead to overloads that could stop data transfer temporarily. The above-identified U.S. Patents and patent applications provide explanations of certain technical aspects of a packet based telecommunications network environment, such as Internet/Intranet technology based largely on the TCP/IP protocol suite, and describe the deployment of bandwidth management solutions to monitor and manage network environments using such protocols and technologies.

An important aspect of implementing enterprise-grade network environments is provisioning mechanisms that address or adjust to the failure of systems associated with or connected to the network environment. For example, FIG. 1A illustrates a computer network environment including an application traffic management device 130 deployed to manage network traffic traversing an access link 21 connected to a computer network 50, such as the Internet, or an Internet Service Provider or Carrier Network. As one skilled in the art will recognize the failure of application traffic management device 130 will prevent the flow of network traffic between end systems connected to LAN 40 and computer network 50. To prevent this from occurring, one prior art mechanism is to include a relay that actuates a switch to create a direct path for electrical signals across the application traffic management device 130, when a software or hardware failure disables application traffic management device 130. In this manner, the application traffic management device 130 essentially acts as a wire, allowing network traffic to pass to thereby preserve network access. The problem with this approach is that, while network access is preserved, there is no failover mechanism to control or optimize network traffic while the application traffic management device 130 remains down.

To provide failover support that addresses this circumstance, the prior art included a "hot standby" mechanism offered by Packeteer, Inc. of Cupertino, Calif., for use in shared Ethernet network environments employing the Carrier Sense Multiple Access with Collision Detection (CSMA/CD) protocol. As FIG. 1B illustrates, redundant application traffic management devices 230a, 230b are deployed between router 22 and LAN 40. The inherent properties of the shared Ethernet LANs 40 and 41 meant that all inbound and outbound packets were received at both application traffic management devices 230a, 230b. According to the hot standby mechanism, one application traffic management device 230a (for instance) operated in a normal mode classifying and shaping network traffic, while the other application traffic management device 230b operated in a monitor-only mode where the packets were dropped before egress from the device. The application traffic management devices 230a, 230b were also configured to communicate with each other over LAN 40 and/or 41 to allow each device to detect when the other failed. When such a failure occurred, application traffic management device 230b previously operating in a monitor-only mode, could provide failover support in a substantially seamless fashion since its data structures were already populated with the information required to perform its function.

While the hot standby feature is suitable in shared Ethernet environments, the use of Ethernet LAN switches in more modern enterprise networks has presented further challenges. According to switched Ethernet environments, packets are directed through the intermediate network devices in the communications path to the destination host, rendering invalid the assumption upon which the hot standby mechanism is based. FIG. 2A illustrates a computer network environment implemented by LAN switches 23, where the end systems such as computers 42 and servers 44 are connected to different ports of a LAN switch 23. In the network environment of FIG. 2A, LAN switches 23 connect application traffic management devices 30a, 30b to router 22, as well as the end systems associated with an enterprise network. While the application traffic management devices 30a, 30b are deployed in a redundant topology, without the present invention, there is no mechanism that ensures that one application traffic management device can seamlessly take over for the other device should one fail.

Furthermore, many enterprise network architectures feature redundant topologies for such purposes as load-sharing and failover. For example, as FIG. 2B illustrates a typical enterprise network infrastructure may include a plurality of access links (e.g., 21a, 21b) connecting an enterprise LAN or WAN to an open computer network 50. In these network topologies, network traffic may be directed completely through one route or may be load-shared between alternative routes. According to these deployment scenarios, a given application traffic management device 30a or 30b during a given span of time may see all network traffic, part of the network traffic, or no network traffic. This circumstance renders control of network traffic on a network-wide basis problematic, especially when the application traffic management devices 30a, 30b each encounter only part of the network traffic. That is, each application traffic management device 30a, 30b, without the invention described herein, does not obtain enough information about the network traffic associated with the entire network to be able to accurately monitor network traffic and make intelligent decisions to control or shape the network traffic flowing through the corresponding access links 21a, 21b. In addition, if a given application traffic management device 30a, 30b sees no traffic for a period of time and the active route fails (for example), the application traffic management device deployed on the alternate route essentially becomes the master controller but possesses no prior information about existing flows or other network statistics. This circumstance often renders it impossible to adequately classify data flows associated with connections active at the time of a change or failover in the active application traffic management device.

Synchronization of network devices in redundant network topologies also presents certain technical challenges in the realm of data compression. Data compression, caching and other technologies that optimize network traffic are often deployed to improve the efficiency and performance of a computer network and ease congestion at bottleneck links. For example, implementing data compression and/or caching technology can improve network performance by reducing the amount of bandwidth required to transmit a given block of data between two network devices along a communications path. Data compression technologies can be implemented on routing nodes without alteration of client or server end systems, or software applications executed therein, to reduce bandwidth requirements along particularly congested portions of a communications path. For example, tunnel technologies, like those used in Virtual Private Network (VPN) implementations, establish tunnels through which network traffic is transformed upon entering at a first network device in a communications path and restored to substantially the same state upon leaving a second network device. However, issues concerning synchronization of compression dictionaries, as well as the additional overhead in updating flow control statistics in light of packet compression, present certain technical challenges.

In light of the foregoing, a need in the art exists for methods, apparatuses, and systems that facilitate the synchronization of network traffic compression mechanisms deployed in redundant network topologies. Embodiments of the present invention substantially fulfill these needs.

SUMMARY OF THE INVENTION

The present invention provides methods, apparatuses and systems facilitating synchronization of network traffic compression mechanisms deployed in redundant network topologies. In one implementation, the present invention features the synchronization of compression statistics on redundant network devices to facilitate failover and load sharing operations in the management of data flows traversing computer network environments. In one implementation, compression meta data is appended to synchronization packets and transmitted to one or more partner or redundant network devices. The receiving network devices use the compression meta data to synchronize one or more data flow control processes or data structures. Implementations of the present invention also feature process flows that increase the efficiency of synchronizing compression related operations.

DESCRIPTION OF THE DRAWINGS

FIG. 1B is a functional block diagram showing the deployment of redundant network devices in a CSMA/CD network environment.

FIG. 2C is a functional block diagram showing the deployment of redundant application traffic management devices in a computer network environment.

FIG. 2D is a functional block diagram illustrating a computer network environment including redundant application traffic management devices 30a, 30b interconnected with corresponding pairs of synchronization interfaces.

FIG. 2E is a functional block diagram illustrating the network interfaces and other functionality associated with a network device configured according to an embodiment of the present invention.

FIG. 2F is a functional block diagram illustrating an alternative connection scheme between the first and second network devices for the exchange of network traffic synchronization data.

FIG. 2H is a functional block diagram illustrating a computer network environment including first and second network devices 530a, 530b transmitting synchronization packets over VPN connections.

FIG. 2I is a functional block diagram illustrating the functionality associated with an application traffic management device including third and fourth non-synchronization network interfaces.

FIG. 3 is a functional block diagram setting forth the functionality in an application traffic management device according to an embodiment of the present invention.

FIG. 4 is a flow chart diagram illustrating a method, according to one implementation, directed to probing communications paths for remote network devices that include compression capabilities.

FIG. 5B is a flow chart diagram setting forth a method, according to one implementation of the present invention, directed to processing responses to probes.

FIG. 6A is a flow chart diagram providing a method, according to one implementation of the present invention, directed to synchronizing two or more network devices that include compression operations.

FIG. 6B is a flow chart diagram providing a method, according to another implementation of the present invention, directed to synchronizing two or more network devices that include compression operations.

FIG. 7 is a flow chart diagram illustrating a method, according to another implementation of the present invention, featuring the use of magic numbers to identify potential configuration or connection errors.

DESCRIPTION OF PREFERRED EMBODIMENT(S)

Figure 2A:
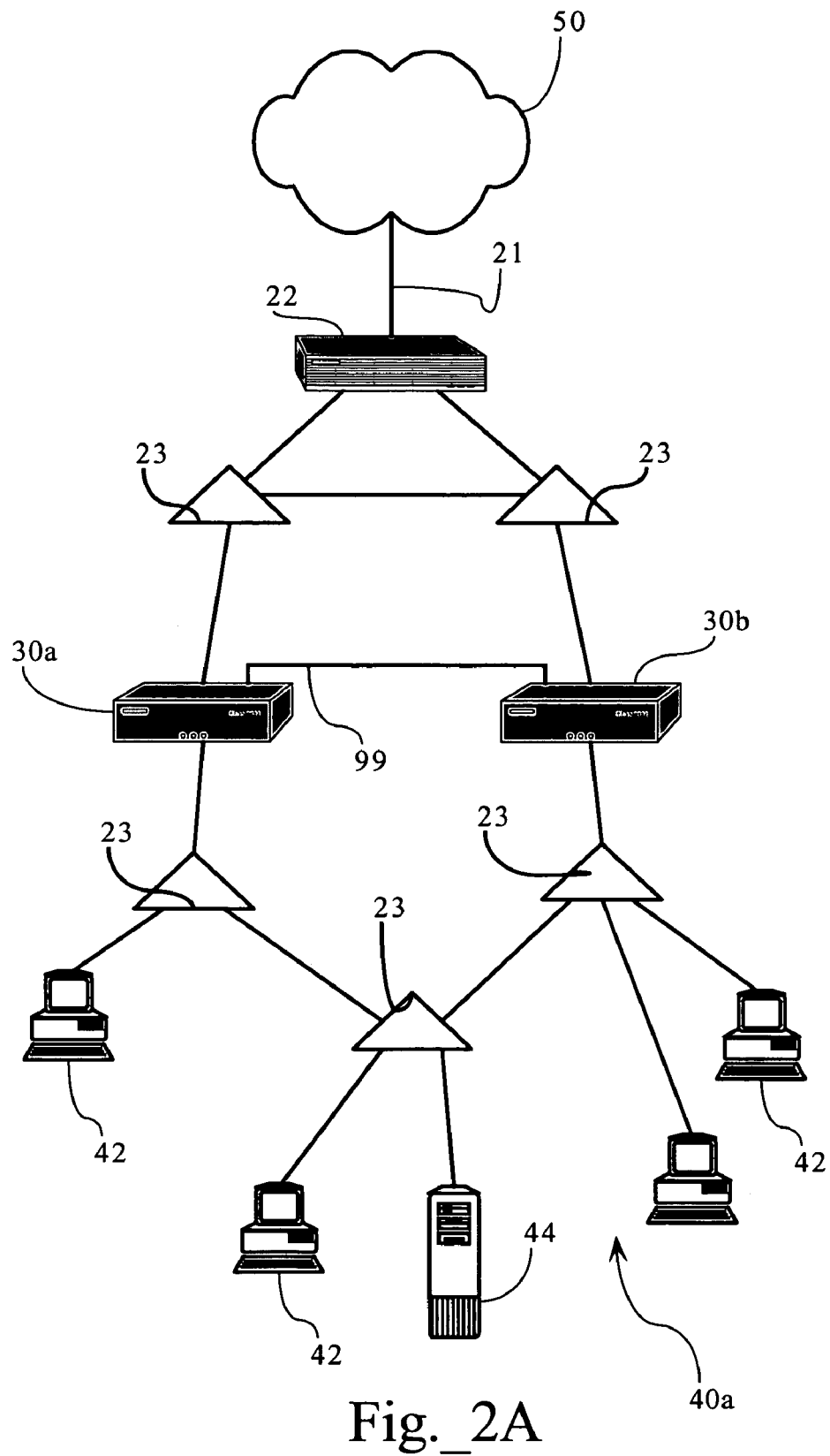
FIG. 2A is a functional block diagram illustrating a computer network environment including first and second application traffic management devices 30a, 30b and LAN switches 23.

FIG. 2C illustrates the general operating environment in which implementations of the present invention may operate. As FIG. 2C illustrates, network 50 interconnects networks 40a and 40b. As FIG. 2A shows, computer network 40a interconnects several TCP/IP end systems, including client devices 42 and server device 44, and provides access to resources operably connected to computer network 50 via router 22. Access link 21 is a physical and/or logical connection between two networks, such as computer network 50 and network 40a. The computer network environment, including computer networks 40a, 40b, and 50 is a packet-based communications environment, employing TCP/IP protocols, and/or other suitable protocols, and has a plurality of interconnected digital packet transmission stations or routing nodes. Application traffic management devices 30a, 30b, and 30c are disposed on the communications path between end systems (e.g., end system 42b) connected to network 40b and end systems (e.g., end system 42a) connected to network 40a. As FIG. 2C illustrates, network 40a includes redundant application traffic management devices 30a, 30b. As discussed more fully below, application traffic management devices 30a, 30b and 30c, in one implementation, are edge network devices operative to manage network traffic transmitted to and from their respective networks. As discussed more fully below, application traffic management device 30c is operative to establish compression tunnels with application traffic management devices 30a and 30b, and vice versa. That is, application traffic management device 30c is operative to compress network traffic destined for hosts on network 40a and tunnel the traffic to either of application traffic management devices 30a, 30b, which decompresses the network traffic before it is forwarded to the respective destination hosts.

Figure 2B:
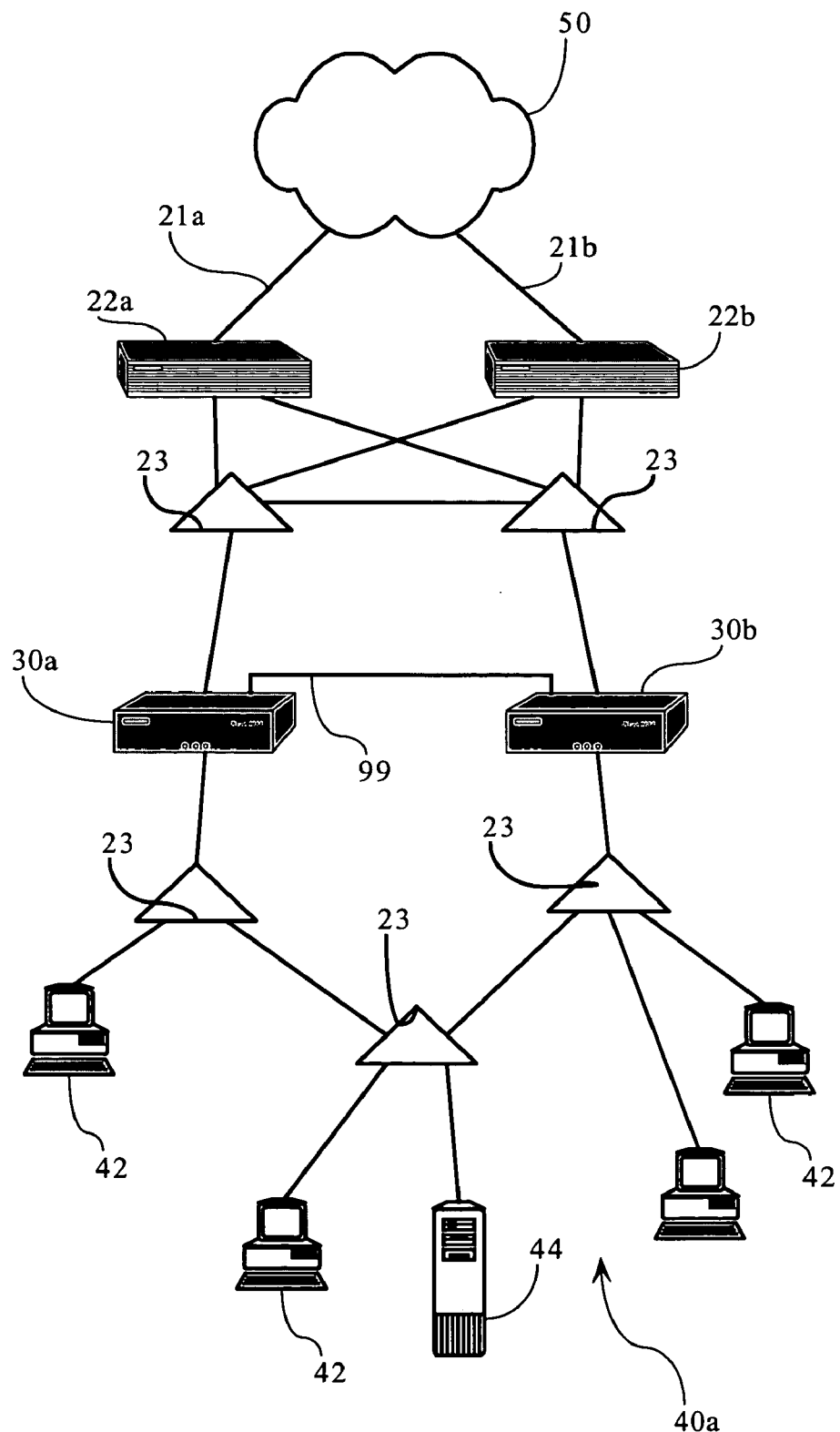
FIG. 2B is a functional block diagram illustrating a computer network environment including first and second application traffic management devices 30a, 30b deployed to control traffic across redundant access links 21a, 21b.

FIGS. 2A and 2B provide a more detailed illustration of the possible network topologies corresponding to network 40a. FIG. 2A illustrates a computer network environment where access link 21 and router 22 connect network 40a to computer network 50. As FIG. 2A shows, the network environment includes redundant application traffic management devices 30a, 30b operatively connected to communication paths between network 40a and router 22 via LAN switches 23. FIG. 2B illustrates a computer network environment featuring a redundant network topology, that includes first and second access links 21a, 21b; routers 22a, 22b; and application traffic management devices 30a, 30b. Access links 21a, 21b operably connect computer network 40a to computer network 50. In one embodiment, computer network 40a is a Local Area Network (LAN). In another implementation, network 40a is an enterprise WAN comprising a plurality of LAN segments. In one embodiment, computer network 50 is a Wide Area computer network, such as the Internet, or a service provider or carrier network. As one skilled in the art will recognize, the network topology can be expanded to include additional access links and associated network devices. LAN switches 23 include a plurality of ports to which end systems, such as client computers 42 and servers 44, and intermediate systems, such as routers and other switches, are connected. LAN switches 23 receive packets on a given port and forward the packets to other network devices on selected ports. In one embodiment, LAN switch 23 is an Ethernet-based (IEEE 802.3) switch. Other implementations are possible. For example, some or all switches 23 can be replaced by other network devices such as load balancers, especially in the communications path between access link 21 and redundant network devices 30a, 30b.

As discussed above, FIGS. 2A and 2C illustrate a packet-based computer network environment including application traffic management devices 30a, 30b, 30c deployed to manage data flows traversing respective access links. As part of this function, application traffic management devices 30a, 30b, 30c include compression functionality to reduce the size of, and thus bandwidth consumption associated with, data flows transmitted between networks 40a and 40b. In the network environment of FIG. 2B, application traffic management devices 30a, 30b by operation of LAN switches 23 are operative to manage data flows traversing access links 21a, 21b respectively. As FIG. 2A illustrates, application traffic management devices 30a, 30b, in one embodiment, are provided between router 22, respectively, and computer network 40a. As discussed in more detail below, application traffic management devices 30a, 30b, in one implementation, are each operative to classify data flows and, depending on the classification, enforce respective bandwidth utilization controls on the data flows to control bandwidth utilization across and optimize network application performance across access link 21. Of course, the present invention can be integrated into other types of network devices, such as proxy servers, database servers, and the like. In the network environment of FIG. 2A, application traffic management device 30b, in one embodiment, may be deployed solely to provide failover support in case of the failure of application traffic management device 30a. Other operational configurations, however, are possible. In the network environment of FIG. 2B, for example, application traffic management devices 30a, 30b may operate concurrently to control bandwidth utilization across respective access links 21a, 21b with one unit able to seamlessly take over for the other should either unit itself, a LAN switch 23, a router 22a or 22b, and/or access links 21a or 21b fail. In such an embodiment, LAN switches 23 include the capability or re-directing traffic to alternate ports upon the detection of a network or device failure.

A. Packet Synchronization Interfaces

In some implementations, synchronization packets can be transmitted and received on the same interfaces as regular traffic. For example, packets received at network interface 71 can be transmitted as synchronization packets from that interface to a partner network device. In one implementation, packets received at network interfaces 71 and 72 are transmitted as synchronization packets on inside network interface 71, since network interface 71 is often connected to a LAN with more available bandwidth than the outside access link. As discussed below, however, other implementations include dedicated interfaces for the receipt and transmission of synchronization packets. As one skilled in the art will recognize the physical configuration of the network devices, such as the number of network interfaces employed, may influence the form of synchronization packets, such as whether synchronization packets are encapsulated, whether they identify the ingress interface, and the like.

Application traffic management devices 30a, 30b are operably connected to exchange packet data in order to synchronize operations and/or data structures between each other. As the following provides, application traffic management devices 30a, 30b can be connected to synchronize network traffic operations in a variety of configurations. As FIGS. 2A and 2B illustrate, transmission line 99 interconnects application traffic management devices 30a, 30b to allow for sharing of network traffic data in the form of synchronization packets. FIG. 2E further illustrates the configuration of application traffic management device 30a according to an embodiment of the present invention. As FIG. 2E shows, application traffic management device 30a comprises application traffic management module 75, and, in one embodiment, network interfaces 71, 72, and synchronization network interface 74. As FIG. 2E illustrates, network interfaces 71 and 72 operably connect application traffic management device 30a to the communications path between computer network 40a and router 22a and are the interfaces at which regular network traffic is received. Synchronization network interface 74 connects application traffic management device 30a, via transmission line 99, to one or more partner devices, such as application traffic management device 30b. In one embodiment, alt synchronization packets whether arriving at network interface 71 or network interface 72 are exchanged over synchronization network interface 74. In one such embodiment, the interface at which the packet arrived is indicated in a reserved header field in the synchronization header encapsulating the copied packet. As discussed below, in another embodiment not using synchronization headers, the network interface identifier overwrites a portion of the copied packet data.

Application traffic management devices 30a, 30b may be connected via synchronization network interface 74 in a variety of manners. As discussed above, synchronization network interfaces 74 of application traffic management devices 30a, 30b may be connected via a direct line, such as a CAT-5 cable. In one embodiment, synchronization network interface 74 is a wired Ethernet-based (IEEE 802.3) interface. In another embodiment, synchronization network interface 74 may be a wireless network interface (e.g., IEEE 802.11) allowing for wireless transmission of synchronization packets between application traffic management devices 30a and 30b. In such an embodiment, the synchronization packets are preferably encrypted to guard against unauthorized detection or analysis of the network traffic. In another embodiment, synchronization network interface 74 may be directly connected to computer network 40a to allow for transmission of copied packets over computer network 40a. In such an embodiment, the copied packets are encapsulated in synchronization headers (see below) to allow LAN switch 23 or other network device to transmit the synchronization packets to the proper destination.

Figure 2G:
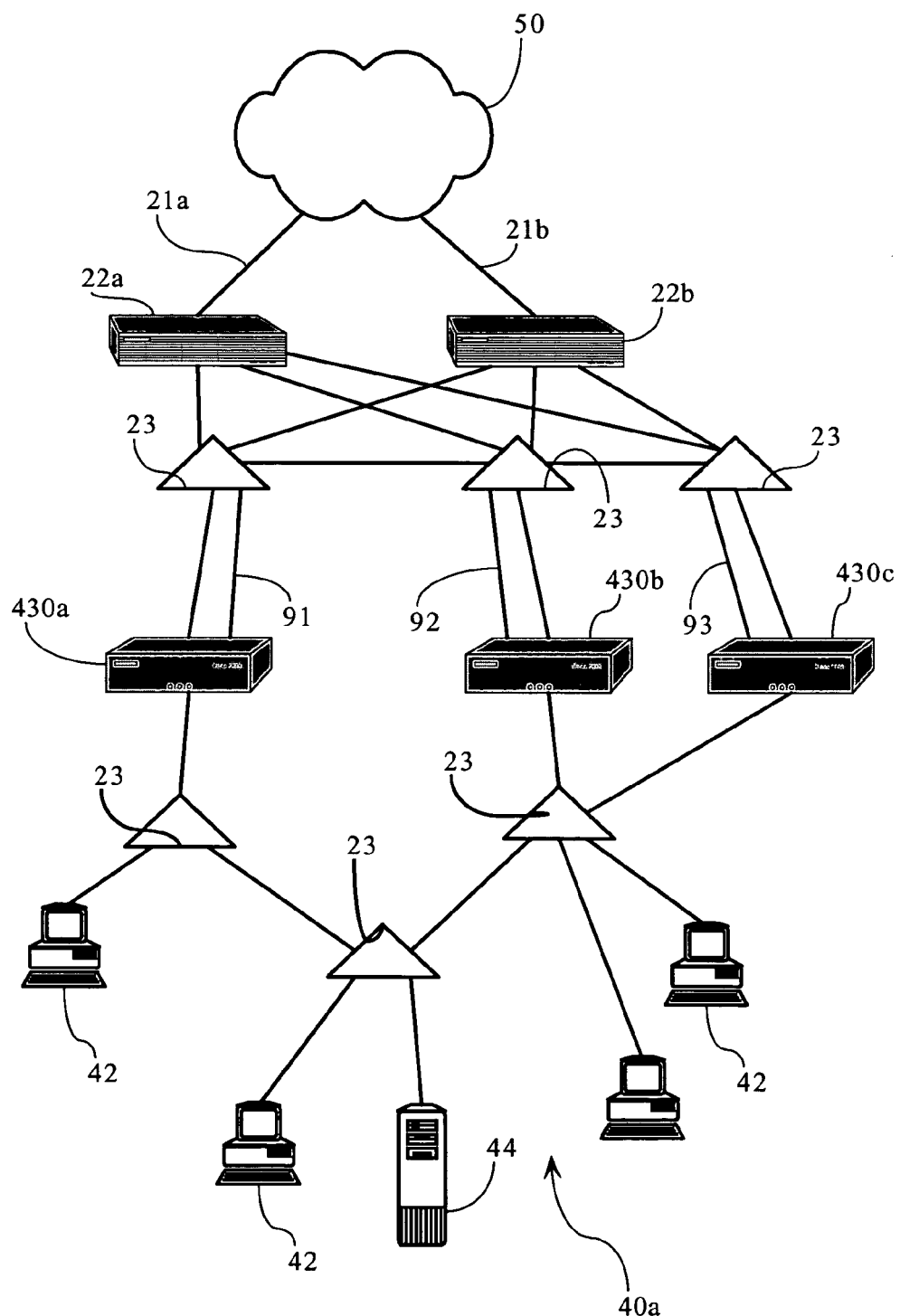
FIG. 2G is a functional block diagram illustrating a computer network environment including first, second and third network devices 430a, 430b and 430c deployed to control traffic across redundant access links 21a, 21b.

As FIGS. 2D and 2F illustrate, in another embodiment, an additional network interface 73 may also be used as a synchronization interface that connects application traffic management device 30a, via a direct transmission line or indirect connection (e.g., through computer network 140), to one or more partner network devices, such as application traffic management device 30b for the exchange of synchronization packets. Such an embodiment allows network interfaces 71 or 72 to be paired with a respective synchronization interface 73 or 74 to obviate the need for flagging or explicitly determining the interface at which the packet was received. As FIG. 2F illustrates, assuming network interface 73 is used as a synchronization interface, network interface 73 can be directly connected to a corresponding synchronization interface on application traffic management device 30b via transmission line 98. As FIGS. 2D and 2F illustrate, synchronization network interface 74 of application traffic management device 30a is connected to a corresponding network interface on a partner application traffic management device 30b via transmission line 97. Alternatively, network interface 73 and/or network interface 74 may be connected to computer network 40a such that copied packets are transmitted over computer network 40 between application traffic management devices 30a, 30b. As discussed above, connecting the synchronization interfaces over a LAN or other computer network supporting regular network traffic, however, requires encapsulation of the packets with the appropriate MAC or other network address to ensure that they reach their intended destination. Such a configuration, however, allows synchronization packets to be multicast (or broadcast in a VLAN) to more than one partner network device to allow for synchronization of more than two network devices. In one implementation, VLAN identifiers can be used to identify to which interface or port a given synchronization packet corresponds. For example, one VLAN can be implemented for synchronization packets corresponding to packets received on inside network interfaces 71 of the partner network device, while another VLAN can be implemented for outside network interfaces. In another implementation, the priority bits of the VLAN tag can be used to identify the interface or port on which the packet was received. Other implementations may use MPLS tags to identify the interface or port on which the packet was received. As FIG. 2G illustrates, in embodiments involving more than two partner application traffic management devices 430a, 430b, 430c, the synchronization interfaces 74 may be connected to a computer network via lines 91, 92, and 93. In the embodiment shown including LAN switches 23, the synchronization packets require encapsulation and the use of a multicast MAC address to ensure that each synchronization interface 74 receives all synchronization packets. In one embodiment, the synchronization network interfaces may be connected to the same virtual Local Area Network (VLAN) to facilitate layer 2 discovery mechanisms and the automatic configuration of network devices for the transmission of synchronization packets. In one embodiment, synchronization packets may then be broadcast or multicast to all the network devices in the VLAN. In another embodiment, the synchronization interfaces 74 of network devices 430a, 430b, 430c can be connected to an Ethernet hub obviating the need to encapsulate the packets and/or use a multicast MAC address, since a given synchronization interface will, by operation of the hub, see the packets sent from the other two synchronization interfaces.

In yet another embodiment, VPN servers or similar functionality may be employed to tunnel and encrypt the synchronization packets transmitted between network devices. For example, application traffic management devices 530a and 530b are connected to VPN servers 43 via transmission lines 94, 95 (see FIG. 2H). In such an embodiment, VPN servers 43 (labeled, VPN 1 and VPN 2) encrypt and tunnel the synchronization packets between application traffic management devices 530a, 530b. In yet another embodiment, all regular network traffic and the synchronization packets can be transmitted over transmission lines 94, 95 and through VPN servers 43, obviating the second connections between application traffic management devices 530a, 530b and LAN switches 23. Furthermore, VPN functionality could also be implemented across transmission line 99 (or wireless connection) between application traffic management devices 30a, 30b (see FIG. 2B).

Application traffic management module 75, as discussed more fully below, generally refers to the functionality implemented by application traffic management devices 30a, 30b. In one embodiment, application traffic management module 75 is a combination of hardware and software, such as a central processing unit, memory, a system bus, an operating system and an application traffic management application. In one embodiment, network interfaces 71, 72, 73 and 74 are implemented as a combination of hardware and software, such as network interface cards and associated software drivers. In addition, the network interfaces 71, 72, 73 and 74 can be wired network interfaces, such as Ethernet interfaces, or wireless network interfaces, such as 802.11, BlueTooth, satellite-based interfaces, and the like.

Other configurations are possible. For example, as discussed above, one or more physical network interfaces 73 or 74 may be omitted. In a less preferred embodiment, for example, if network interface 74 is omitted, copied packets can be transmitted between application traffic management devices 30a and 30b over LAN switches 23 via respective network interfaces 71. Still further, application traffic management device 30a may include more than two non-synchronization network interfaces. As FIG. 21 illustrates, application traffic management device 630a may include network interfaces 71a, 71b, 72a, and 72b. In such an embodiment, the synchronization packets transmitted to the partner network device are marked as discussed above with the network interface identifier corresponding to the network interface at which the original packet was received. In one embodiment, the application traffic management device 630a can be configured only to copy and transmit synchronization packets on a particular subset of its non-synchronization network interfaces.

According to an embodiment of the present invention, packets received from computer network 50 by application traffic management device 30a at network interface 72 are copied and transmitted to partner application traffic management device 30b from network interface 74. Similarly, partner application traffic management device 30b copies and transmits packets received from computer network 50 at its corresponding network interface 72 to application traffic management device 30a. Similarly, application traffic management device 30a copies and transmits packets received at network interface 71 to partner application traffic management device 30b via network interface 74. Application traffic management device 30a also receives, at network interface 74, packets copied and transmitted by network device 30b. In one embodiment, the partner application traffic management devices 30a, 30b do not copy and transmit as synchronization packets any multicast or broadcast packets.

In the embodiment discussed above, application traffic management devices 30a, 30b may exchange synchronization packets corresponding to packets received at network interfaces 71 and 72 over a single transmission line 99 or other connection, using a single network interface (e.g., 74) at each application traffic management device. In such an embodiment, the synchronization packets may take many forms. In one embodiment, the copied packets are overwritten in predetermined locations with state information, such as an identifier for the interface on which the packet was received, a packet receipt time, etc. As discussed more fully below, this state information may also include compression statistics associated with the copied packets. For example, the compression statistics appended to a packet may include a compression ratio, and/or a packet size difference before and after compression. This state information, in one embodiment, overwrites data not implicated in or affecting the network function performed by the network devices 30a, 30b. For example, certain state information, such as an interface identifier can be written into the checksum field of the packet header. In another embodiment, state information is written over the last N bytes of the packet. Overwriting data in the packets avoids the possibility of exceeding the maximum Message Transmission Unit (MTU) size associated with the data link layer protocol.

In other embodiments, however, the copied packets are encapsulated with synchronization headers. In one such embodiment, the synchronization packet headers can include a field identifying the network interface on which the packet was received (e.g., indicating whether the encapsulated packet was received at the outside or inside network interface). In one embodiment, the synchronization header includes a 4-byte signature field (including a magic number), an interface identifier, and optionally a time stamp. The 4-byte signature is intended to allow the network devices 30a, 30b to detect a possible configuration or connection error. That is, if the packets received on the synchronization interfaces do not include the appropriate magic number in the signature field, it is assumed that the synchronization interface has been improperly connected to another network device or network interface, rather than a synchronization interface associated with a partner network device. In such a circumstance, the application traffic management devices 30a, 30b are configured to report this error condition and terminate the synchronization functionality described herein. In addition, the synchronization header may also include a compression statistics field. In one implementation, a null value in this field indicates that no compression/decompression was applied to the packet. In another implementation, the synchronization header may include a compression flag to indicate whether compression or decompression algorithms were applied to the packet.

According to embodiments of the present invention, packets received at synchronization network interfaces 73 and/or 74 are flagged as synchronization packets to allow application traffic management device 30a or 30b to distinguish between packets received directly by it or a partner device. As discussed more fully below, application traffic management module 75 processes regular and synchronization packets and, in one embodiment, discards packets flagged as synchronization packets. More specifically and in one embodiment, application traffic management module 75 processes a data flow originally encountered at a partner application traffic management device at a network interface (e.g., network interface 74) as if it were a normal data flow received directly at outside network interface 72. So, for example, the packets can influence measurement statistics, MIB variables, fill queues and other data structures, etc. However, the flagged synchronization packets associated with the data flow are discarded, as opposed to being released at inside network interface 71. Synchronization data flows traveling in the opposite direction received at synchronization interface 74 or synchronization interface 73 are processed in a similar manner.

In this manner, the packet synchronization functionality allows for substantially seamless failover support, since the state of the application traffic management devices 30a, 30b can be synchronized. For example, if application traffic management device 30a fails, application traffic management device 30b, armed with state information of data flows traversing application traffic management device 30a, can essentially begin processing the data flows at the point where application traffic management device 30a failed.

B. Application Traffic Management Device Functionality

The following provides a detailed description of the packet synchronization functionality integrated into application traffic management applications that monitor and/or control network traffic flowing across access links, and are capable of compressing data flows that are decompressed by other network devices. As discussed above, application traffic management devices 30a and 30b, in one embodiment, are operative to manage data flows traversing access links 21a, 21b. The above-identified, commonly-owned patents and patent applications disclose the functionality and operation of application traffic management devices. As discussed herein, application traffic management devices 30a, 30b are operative to classify data flows and, depending on the classification, enforce respective bandwidth utilization controls on the data flows to control bandwidth utilization across and optimize network application performance across access links 21a, 21b. However, as discussed above, the present invention can be integrated into other network device types, such as proxies, gateways, routers, firewalls, and the like. In addition, FIG. 3 is also representative of the functionality implemented on application traffic management device 30c, except for the synchronization functionality described herein. However, application traffic management devices 30a, 30b may establish compression tunnels with any compatible network devices in the communications path between corresponding hosts. As discussed below, however, application traffic management device 30c, or other compression-enabled network device, in one implementation, includes functionality for dynamically selecting one of the application traffic management devices 30a or 30b with which to tunnel network traffic.

FIG. 3 is a block diagram illustrating functionality, according to one embodiment of the present invention, included in application traffic management devices 30a, 30b, 30c. In one embodiment, application traffic management devices 30a, 30b, 30c comprise packet processor 82, flow control module 84, compression module 88, measurement engine 140, traffic classification engine 86, management information base (MIB) 138, host database 134, flow database 135, and administrator interface 150. Packet processor 82 is operative to detect new data flows and construct data structures including attributes characterizing the data flows. Flow control module 84 is operative to enforce bandwidth utilization controls on data flows traversing bandwidth management device 30. Compression module 88 is operative to establish and maintain compression tunnels with compatible routing nodes or other network devices in a communications path. In one embodiment, compression module 88 is operative to probe communication paths for routing nodes or other network devices that include compatible compression and tunneling capabilities.

Traffic classification engine 86 is operative to analyze data flow attributes and identify traffic classes corresponding to the data flows, as discussed more fully below. In one embodiment, traffic classification engine 86 stores traffic classes associated with data flows encountered during operation of the application traffic management device, as well as manually created traffic classes and a hierarchical traffic class structure, if any, configured by a network administrator. In one embodiment, traffic classification engine 86 stores traffic classes, in association with pointers to bandwidth utilization controls or pointers to data structures defining such bandwidth utilization controls. Management information base 138 is a database of standard and extended network objects related to the operation of application traffic management device 30a, 30b, 30c. Measurement engine 140 maintains measurement data relating to operation of application traffic management device 30a, 30b, 30c to allow for monitoring of bandwidth utilization across the access links with respect to a plurality of bandwidth utilization and other network statistics on an aggregate and/or per-traffic-class level. Host database 134 stores IP addresses and corresponding data associated with data flows traversing application traffic management device 30*a*, 30*b*, 30*c*. Flow database 135 stores and maintains flow state information associated with data flows traversing application traffic management device 30*a*, 30*b*, 30*c*.

Administrator interface 150 facilitates the configuration of application traffic management device 30*a*, 30*b*, 30*c* to adjust or change operational and configuration parameters associated with the device. For example, administrator interface 150 allows administrators to select identified traffic classes and associate them with bandwidth utilization controls (e.g., a partition, a policy, etc.), as well as configure parameters associated with partner application traffic management devices. Administrator interface 150 also displays various views associated with a hierarchical traffic classification scheme and allows administrators to configure or revise the hierarchical traffic classification scheme. Administrator interface 150 can also be used to configure the traffic synchronization functionality described herein. In addition, administrator interface 150 also facilitates configuration of the compression tunnel functionality described herein. For example, in implementations that do not feature dynamic tunnel probing, a network administrator can specify the network addresses of remote devices with which compression tunnels can be established, and whether any such network devices are redundant or partner network devices that can be switched between in case of a failure event. Administrator interface 150 can be a command line interface or a graphical user interface accessible, for example, through a conventional browser on client device 42.

B.1. PACKET PROCESSOR

As discussed above, packet processor 82, in one implementation, is operative to detect new data flows, instantiate data structures associated with the flows and parse packets to populate one or more fields in the data structures. In one embodiment, when packet processor 82 encounters a new data flow it stores the source and destination IP addresses contained in the packet headers in host database 134. Packet processor 82 further constructs a control block (flow) object including attributes characterizing a specific flow between two end systems. In one embodiment, packet processor 82 writes data flow attributes having variably-sized strings (e.g., URLs, host names, etc.) to a dynamic memory pool. The flow specification object attributes contain attribute identifiers having fixed sizes (e.g., IP addresses, port numbers, service IDs, protocol IDs, etc.), as well as the pointers to the corresponding attributes stored in the dynamic memory pool. Other flow attributes may include application specific attributes gleaned from layers above the TCP layer, such as codec identifiers for Voice over IP calls, Citrix® tags, Oracle® database identifiers, and the like. Packet processor 82, in one embodiment, reserves memory space in the dynamic memory pool for storing such variably-sized attribute information as flows traverse application traffic management device 30*a*, 30*b*, 30*c*. Packet processor 82 also stores received packets in a buffer structure for processing. In one embodiment, the packets are stored in the buffer structure with a wrapper including various information fields, such as the time the packet was received, the ingress interface or port, the egress interface or port, packet size, and a pointer to the control block object corresponding to the flow of which the packet is a part.

Figure 1A:
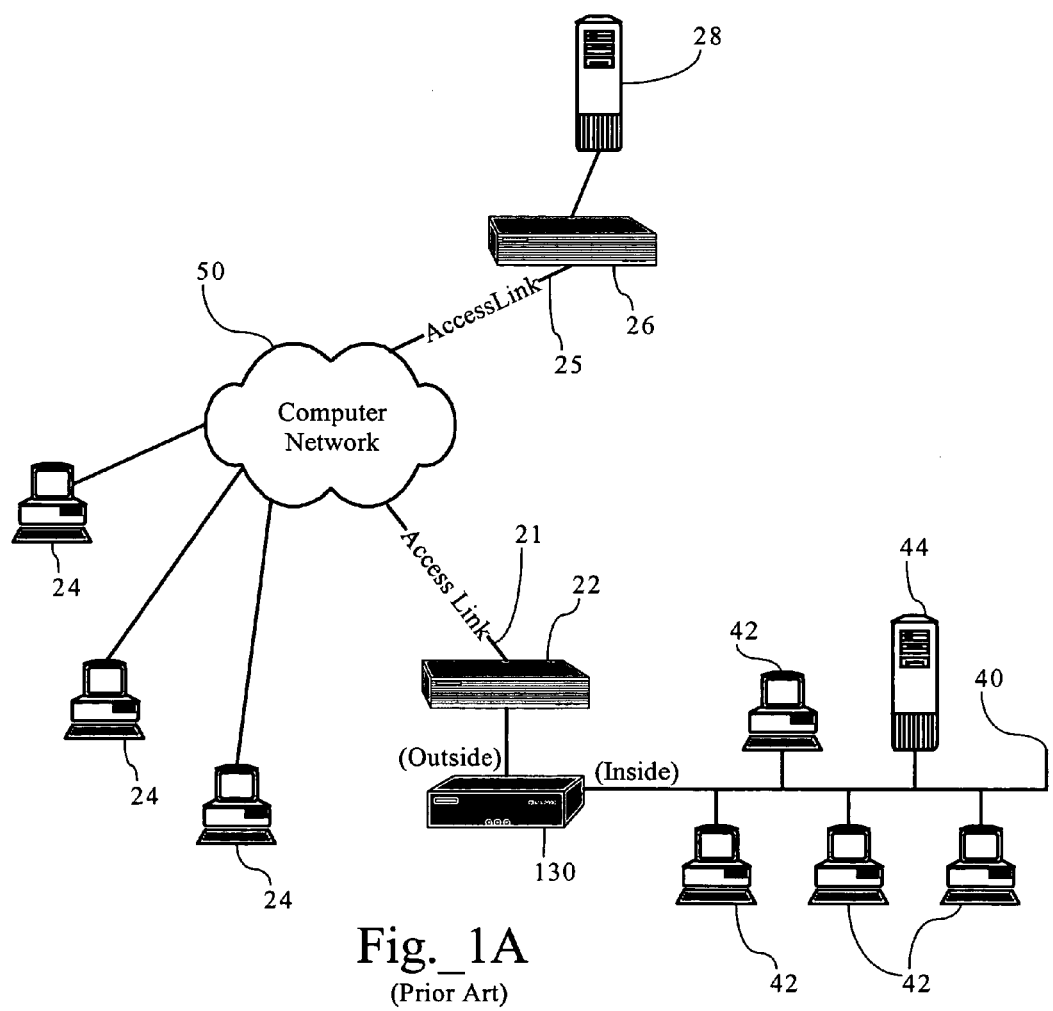
FIG. 1A is a functional block diagram illustrating a computer network environment including a bandwidth management device deployed in a non-redundant network environment including a single access link.

In one embodiment, a control block object contains a flow specification object including such attributes as pointers to the "inside" and "outside" IP addresses in host database 134, as well as other flow specification parameters, such as inside and outside port numbers, service type (see below), protocol type and other parameters characterizing the data flow. In one embodiment, such parameters can include information gleaned from examination of data within layers 2 through 7 of the OSI reference model. U.S. Pat. Nos. 6,046,980 and 6,591,299, as well as others incorporated by reference herein, disclose classification of data flows for use in a packet-based communications environment. FIG. 1 illustrates the concept associated with inside and outside addresses. As discussed above, in one embodiment, a flow specification object includes an "inside" and "outside" address relative to application traffic management device 30*a*, 30*b*, 30*c*. See FIG. 1. For a TCP/IP packet, packet processor 82 can compute the inside and outside addresses based on the source and destination network addresses of the packet and the direction of the packet flow. Accordingly, an inbound packet is received at the outside interface addressed to a destination host on network 40*a* (see FIG. 2A), while an outbound packet is a packet sourced from a destination host on network 40*a* and addressed to a destination host connected to an outside network, such as 40*b*.

In one embodiment, packet processor 82 creates and stores control block objects corresponding to data flows in flow database 135. In one embodiment, control block object attributes include a pointer to a corresponding flow specification object, as well as other flow state parameters, such as TCP connection status, timing of last packets in the inbound and outbound directions, speed information, apparent round trip time, packet count, etc. Control block object attributes may further include at least one traffic class identifier (or pointer(s) thereto) associated with the data flow, as well as policy parameters (or pointers thereto) corresponding to the identified traffic class. In one embodiment, control block objects may also further include a list of traffic classes for which measurement data (maintained by measurement engine 140) associated with the data flow should be logged. In one embodiment, to facilitate association of an existing control block object to subsequent packets associated with a data flow or connection, flow database 135 further maintains a control block hash table including a key comprising a hashed value computed from a string comprising the inside IP address, outside IP address, inside port number, outside port number, and protocol type (e.g., TCP, UDP, etc.) associated with a pointer to the corresponding control block object. According to this embodiment, to identify whether a control block object exists for a given data flow, packet processor 82 hashes the values identified above and scans the hash table for a matching entry. If one exists, packet processor 82 associates the pointer to the corresponding control block object with the data flow.

To allow for identification of service types (e.g., FTP, HTTP, etc.), packet processor 82, in one embodiment, is supported by one to a plurality of service identification tables in a relational or other suitable database that allow for identification of a particular service type (e.g., application, protocol, etc.) based on the attributes of a particular data flow. Of course, other suitable data structures can be used to support the identification of service types, such as a set of hard-coded instructions, an XML file, and the like. In one embodiment, a services table includes the following fields: 1) service ID, 2) service aggregate (if any), 3) name of service, 4) service attributes (e.g., port number, outside IP address, etc.), and 5) default bandwidth management policy. A service aggregate encompasses a combination of individual services (each including different matching criteria, such as different port numbers, etc.) corresponding to the service aggregate. When application traffic management device 30*a*, 30*b*, 30*c* encounters a new flow, packet processor 82 analyzes the data flow against the service attributes in the services table to identify a service ID corresponding to the flow. In one embodiment, packet processor 82 may identify more than one service ID associated with the flow. In this instance, packet processor 82 may associate the more/most specific service ID to the flow. For example, network traffic associated with a peer-to-peer file sharing service may be identified as TCP or HTTP traffic, as well as higher level traffic types such as the actual file sharing application itself (e.g., Napster, Morpheus, etc.). In this instance, packet processor 82 associates the flow with the most specific service ID. Of course, other implementations may associate all matching service IDs to the flow. A traffic class maintained by traffic classification engine 86 may be configured to include matching rules based on the service IDs in the services table. For example, a matching rule directed to HTTP traffic may simply refer to the corresponding service ID, as opposed to the individual attributes that packet processor 82 uses to initially identify the service.

As to received synchronization packets, packet processor 82 is operative to strip the encapsulating synchronization headers, if any, from the packets and, in some embodiments, use the metadata in the encapsulating headers (or in the overwritten areas of the packets) in place of other information, such as the time the packet was received, as well as, for example, ingress and egress interface identifiers. Packet processor 82 is also operative to flag the packet as a synchronization packet. In one embodiment, packet processor 82 sets the synchronization flag in the wrapper associated with the packet maintained in the packet buffer structure. In one implementation, packet processor 82 also writes compression statistics, if any, into the wrapper, which can be used by other processes and modules as described more fully below. Otherwise, in one implementation, the packet processor 82, and the remaining modules associated with application traffic management device 30a, 30b processes packets in a similar manner to regular data flows.

As discussed above, packet processor 82, in one embodiment, is also operative to copy and transmit packets to one or more partner application traffic management devices. As discussed above, packet processor 82 is operative to copy packets received on outside interface 72 or inside interface 71, encapsulate the packets in synchronization headers (or otherwise include meta data in the packets), and transmit them to one or more partner application traffic management devices, such as application traffic management device 30a or 30b. As discussed above, in one embodiment, packet processor 82 is operative to overwrite certain packet information in the copied packets in addition to or in lieu of encapsulating the packets.

In one optimized embodiment, the synchronization packets may contain only part or a summary of the original packet. For example, at a given point in the classification of a data flow, in one embodiment, the traffic classification process ceases as to that flow—that is, any packets corresponding to the flow are matched to the control block object without further classification. In one embodiment, once this classification process ceases, the synchronization packets may contain only part of the original packet and/or contain summary information. For example, in one embodiment, the synchronization packet includes the original packet header, but omits the payload, only including a payload size value. This configuration reduces the bandwidth requirements of the line between the application traffic management devices 30a, 30b.

B.2. TRAFFIC CLASSIFICATION

A traffic class comprises a set of matching rules or attributes allowing for logical grouping of data flows that share the same characteristic or set of characteristics e.g., a service ID or type (see Section A.1., above), a specific application, protocol, IP address, MAC address, port, subnet, etc. In one embodiment, each traffic class has at least one attribute defining the criterion(ia) used for identifying a specific traffic class. For example, a traffic class can be defined by configuring an attribute defining a particular IP address or subnet. Of course, a particular traffic class can be defined in relation to a plurality of related and/or orthogonal data flow attributes. U.S. Pat. Nos. 6,412,000 and 6,591,299, and U.S. patent application Ser. No. 10/039,992 describe some of the data flow attributes that may be used to define a traffic class, as well as the use of hierarchical classification structures to associate traffic classes to data flows. In one embodiment, application traffic management device 30a, 30b, 30c includes functionality allowing for classification of network traffic based on information from layers 2 to 7 of the OSI reference model. Application traffic management device 30a, 30b, 30c can be configured to include matching rules that define a plurality of network applications commonly found in enterprise networks, such as database applications, Citrix® flows, ERP applications, and the like.

In one embodiment, application traffic management device 30a, 30b, 30c is configured to include a predefined set of traffic classes based upon a knowledge base gleaned from observation of common or known traffic types on current networks. Application traffic management device 30a, 30b, 30c, in one embodiment, also allows an administrator to manually create a traffic class by specifying a set of matching attributes. As discussed above, administrator interface 150, in one embodiment, allows for selection of a traffic class and the configuration of traffic management policies for the selected traffic class. Administrator interface 150, in one embodiment, also allows for the selection and arrangement of traffic classes into hierarchical reference trees. In one embodiment, traffic classification engine 86 also stores traffic classes added by the traffic discovery module. Furthermore, as discussed below, application traffic management device 30a, 30b, 30c may also include traffic class discovery functionality that automatically adds traffic classes to traffic classification engine 86 in response to data flows traversing the device.

Traffic classification engine 86, in one implementation, stores traffic classes associated with data flows that traverse access link 21. Traffic classification engine 86, in one embodiment, stores the traffic classes and corresponding data (e.g., matching rules, policies, partition pointers, etc.) related to each traffic class in a hierarchical tree. This tree is organized to show parent-child relationships—that is, a particular traffic class may have one or more subordinate child traffic classes with more specific characteristics (matching rules) than the parent class. For example, at one level a traffic class may be configured to define a particular user group or subnet, while additional child traffic classes can be configured to identify specific application traffic associated with the user group or subnet.

In one embodiment, the root traffic classifications are "/Inbound" and "/Outbound" data flows. Any data flow not explicitly classified is classified as "/Inbound/Default" or "/Outbound/Default". The "LocalHost" traffic class corresponds to data flows destined for application traffic management device 30*a*, 30*b*, 30*c*, such as requests for stored measurement data or device configuration changes. In one embodiment, traffic classification engine 86 attempts to match to a leaf traffic class node before proceeding to remaining traffic class nodes in the hierarchical configuration. If a traffic class is found, the traffic classification engine 86 stops the instant search process and returns the identified traffic classification. Of course, one skilled in the art will recognize that alternative ways for traversing the hierarchical traffic class configuration can be implemented. For example, traffic classification engine 86 may be configured to traverse all traffic class nodes at a given level before proceeding to lower levels of the traffic classification tree. If more than one traffic class matches the data flow, traffic classification engine 86, in one implementation, can be configured with rules or other logic to select from one of the matching traffic classes. Of course, other selection rules can also be configured.

In one embodiment, administrator interface 150 displays the traffic class tree and allows for selection of a traffic class and the configuration of bandwidth utilization controls for that traffic class, such as a partition, a policy, or a combination thereof. Administrator interface 150 also allows for the arrangement of traffic classes into a hierarchical classification tree. Application traffic management device 30*a*, 30*b*, 30*c* further allows an administrator to manually create a traffic class by specifying a set of matching rules and, as discussed below, also automatically creates traffic classes by monitoring network traffic across access link 21 and classifying data flows according to a set of criteria to create matching rules for each traffic type. In one embodiment, each traffic class node includes a traffic class identifier; at least one traffic class (matching) attribute; at least one policy parameter (e.g., a bandwidth utilization control parameter, a security policy parameter, etc.), a pointer field reserved for pointers to one to a plurality of child traffic classes. In one embodiment, traffic classification engine 86 implements a reference tree classification model wherein separate traffic classification trees can be embedded in traffic class nodes of a given traffic classification tree. U.S. application Ser. No. 10/236,149, incorporated by reference herein, discloses the use and implementation of embeddable reference trees.

B.2.a. Automatic Traffic Classification

In one implementation, a traffic discovery module (not shown) analyzes data flows for which no matching traffic class was found in traffic classification engine 86. The traffic discovery module, in one embodiment, is operative to apply predefined sets of matching rules to identify a traffic class corresponding to non-matching data flows. In one implementation, the traffic discovery module operates on data flows classified as either /Inbound/Default or /Outbound/Default. In one embodiment, the traffic discovery module is configured to include a predefined set of traffic classes based upon a knowledge base gleaned from observation of common or known traffic types on current networks. In one embodiment, the traffic discovery module creates traffic classes automatically in response to data flows traversing application traffic management device 30*a*, 30*b*, 30*c* and stores such traffic classes in traffic classification engine 86. Automatic traffic classification is disclosed in U.S. Pat. Nos. 6,412,000, 6,457,051, and 6,591,299, which are incorporated herein by reference.

As discussed above, the traffic discovery module applies one or more traffic discovery thresholds when deciding whether to present or add newly discovered traffic classes. In one embodiment, the traffic discovery module must detect a minimum number of data flows within a predefined period for a given traffic type before it creates a traffic class in traffic classification engine 86. In one embodiment, auto-discovered traffic classes are automatically assigned predefined traffic management policies. U.S. patent application Ser. No. 09/198,051, now abandoned, incorporated by reference herein, discloses automatic assignment of traffic policies for discovered traffic classes.

B.3. FLOW CONTROL MODULE

As discussed above, flow control module 84 applies bandwidth utilization controls (and, in some embodiments, other policies) to data flows traversing access link 21. Application traffic management device 30*a*, 30*b*, 30*c*, however, can also be configured to implement a variety of different policy types, such as security policies, admission control policies, marking (diffserv, VLAN, etc.) policies, redirection policies, caching policies, transcoding policies, and network address translation (NAT) policies. Of course, one of ordinary skill in the art will recognize that other policy types can be incorporated into embodiments of the present invention. The functionality of flow control module 84, in one implementation, can be conceptually segregated into three main tasks: 1) allocation of bandwidth to individual flows, 2) enforcement of bandwidth allocations, and 3) monitoring of actual bandwidth utilization to provide feedback to subsequent bandwidth allocations. For example, in one implementation, compression module 88 operates on packets just prior to their emission from application traffic management device 30*a*, 30*b*, 30*c*, which prevents flow control module 84 from knowing the actual size of the packet after compression. To allow flow control module 84 to adequately compensate for the reduced size of the compressed packets in computing bandwidth allocations, a historical compression ratio is used to estimate what the size of the packet after compression. This information is appended to the packet and used by flow control module 84 in its bandwidth allocation and rate computation decisions. In one implementation, after compression module 88 compresses the packet, the actual compressed size of the packet, or an adjustment value, is fed back to flow control module 84 which updates one or more statistics.

Allocation of bandwidth is primarily influenced by three main factors: 1) the number of concurrent flows and their respective traffic classifications; 2) the overall or aggregate bandwidth utilization control scheme configured by the network administrator (such as the capacity of the access link, the partitions that have been configured, configured rate policies, and the like), and 3) the respective target rates corresponding to the individual flows. U.S. application Ser. No. 10/810,785 and U.S. Pat. Nos. 5,802,106 and 6,205,120, incorporated by reference above, disclose methods for determining target rates for data flows for use in bandwidth allocation decisions. As discussed above, a user can select a given traffic class and specify one or more bandwidth utilization controls for the traffic class. A bandwidth utilization control for a particular traffic class can comprise an aggregate bandwidth utilization control, a per-flow bandwidth utilization control, or a combination of the two (see Sections B.3.a. & B.3.b.). The combination of bandwidth utilization controls across the traffic classes defines an aggregate bandwidth utilization control scheme. Flow control module 84, in one implementation, computes bandwidth allocations for individual flows on a periodic basis (e.g., 100-150 milliseconds). In another implementation, flow control module 84 can recompute bandwidth allocations on demand as required by the arrival of new data flows.

Flow control module 132 can use any suitable functionality to enforce bandwidth allocations known in the art, including, but not limited to class-based queuing, weighted fair queuing, class-based weighted fair queuing, Committed Access Rate (CAR) and "leaky bucket" techniques. Flow control module 132, in one implementation, may incorporate any or a subset of the TCP rate control functionality described in the cross-referenced U.S. patents and/or patent applications set forth above for controlling the rate of data flows.

B.3.a. Aggregate Bandwidth Utilization Controls

An aggregate bandwidth utilization control operates to manage bandwidth for aggregate data flows associated with a traffic class. An aggregate bandwidth utilization control can be configured to essentially partition the available bandwidth corresponding to a given access link. For example, a partition can be configured to protect a network traffic class by guaranteeing a defined amount of bandwidth and/or Limit a network traffic class by placing a cap on the amount of bandwidth a traffic class can consume. Such partitions can be fixed or "burstable." A fixed partition allows a traffic class to use in the aggregate a defined amount of bandwidth. A fixed partition not only ensures that a specific amount of bandwidth will be available, but it also limits data flows associated with that traffic class to that same level. A burstable partition allows an aggregate traffic class to use a defined amount of bandwidth, and also allows that traffic class to access additional unused bandwidth, if needed. A cap may be placed on a burstable partition, allowing the traffic class to access up to a maximum amount of bandwidth, or the burstable partition may be allowed to potentially consume all available bandwidth across the access link. Partitions can be arranged in a hierarchy—that is, partitions can contain partitions. For example, the bandwidth, or a portion of the bandwidth, available under a parent partition can be allocated among multiple child partitions. In one embodiment, at the highest Level, a partition exists for all available outbound bandwidth, while another partition exists for all available inbound bandwidth across the particular access link. These partitions are then sub-dividable to form a hierarchical tree. For example, an enterprise employing static partitions may define a static partition for a PeopleSoft software application traffic class, and sub-divide this parent partition into a large burstable child partition for its human resources department and a smaller burstable child partition for the accounting department. U.S. patent application Ser. No. 10/108,085 includes a discussion of methods for implementing partitions, as well as novel solutions for implementing partitions arranged in a hierarchical allocation scheme.

In one embodiment, a partition is created by selecting a traffic class and configuring a partition for it. As discussed above, configurable partition parameters include 1) minimum partition size (in bits per second); 2) whether it is burstable (that is, when this option is selected, it allows the partition to use available excess bandwidth; when the option is not selected the partition has a fixed size); and 3) maximum bandwidth to be used when the partition bursts.

Application traffic management device 30*a*, 30*b*, 30*c*, in one embodiment, maintains certain parameter values relating to the outbound (available_outbound_capacity) and inbound capacity (available_inbound_capacity) of access link 21, as well as virtual bandwidth limits (configured_outbound_limit & configured_inbound_limit) configured by a user. The outbound and inbound capacity parameters indicate the absolute capacity of the access link (such as 45 Mbps). The virtual bandwidth limits are bandwidth caps (specified by a user) enforced by flow control module 84 to limit bandwidth utilization to a desired level. In one implementation, application traffic management device 30*a*, 30*b*, 30*c* maintains "Access Set" variables, outbound_access_bps and inbound_access_bps, which define the Outbound and Inbound Partition sizes actually used in connection with computing rate control and other bandwidth management parameters by flow control module 84. For example, if a child traffic class of the root /Inbound traffic class is configured with a partition that is allowed to burst, in one implementation, it may burst up to the current bandwidth cap associated with the root /Inbound partition.

B.3.b. Per-Flow Bandwidth Utilization Controls

Flow control module 84 is also operative to enforce per-flow bandwidth utilization controls on traffic across access link 21. Whereas aggregate bandwidth utilization controls (e.g., partitions, above) allow for control of aggregate data flows associated with a traffic class, per-flow bandwidth utilization controls allow for control of individual data flows. In one embodiment, flow control module 84 supports different bandwidth utilization control types, including, but not limited to, priority policies, rate policies, and discard policies. A priority policy determines how individual data flows associated with a traffic class are treated relative to data flows associated with other traffic classes. A rate policy controls the rate of data flows, for example, to smooth bursty traffic, such as HTTP traffic, in order to prevent a TCP end system from sending data packets at rates higher than access link 21 allows, thereby reducing queuing in router buffers and improving overall efficiency. U.S. patent application Ser. No. 08/742,994 now U.S. Pat. No. 6,038,216, incorporated by reference above, discloses methods and systems allowing for explicit data rate control in a packet-based network environment to improve the efficiency of data transfers. Similarly, U.S. Pat. No. 6,018,516, incorporated by reference above, methods and systems directed to minimizing unneeded retransmission of packets in a packet-based network environment. A rate policy can be configured to establish a minimum rate for each flow, allow for prioritized access to excess available bandwidth, and/or set limits on total bandwidth that the flow can consume. A discard policy causes flow control module 84 to discard or drop data packets or flows associated with a particular traffic class. Other policy types include redirection policies where an inbound request designating a particular resource, for example, is redirected to another server.

B.3.c. Handling Synchronization Packets

As discussed above, synchronization packets are essentially treated like regular packets except that synchronization packets are discarded, in one embodiment, just prior to egress from inside or outside interface 71 or 72. In this manner, the synchronization packets can affect operation of flow control module 84 as the packets fill partition and other flow queues and are otherwise treated as normal packets. In other embodiments, however, the synchronization packets may be discarded at other points in the processing to achieve a variety of objectives. In one embodiment, synchronization packets are distinguished from regular packets by a flag set to indicate that the packet is a synchronization packet. In one embodiment, flow control module 84 is operative to check the state of the synchronization flag just prior to releasing the packet to other modules such as a network interface driver. In some embodiments, compression module 88 can be configured to discard synchronization packets prior to or after compression. In other embodiments, the network interface drivers can be configured to check for synchronization flags and discard flagged packets.

B.3.d. Interoperability with Compression

The size of the packets emitted from application traffic management devices 30*a*, 30*b*, 30*c* play a large role in computing bandwidth utilization and allocation. Flow control module 84, therefore, must also account for packet compression in both the inbound and outbound directions. In one implementation, compression module 88 (see below) operates on outbound packets as one of the last operations prior to egress from application traffic management device 30a, 30b, 30c. For example, in one implementation, compression module 88 operates on outbound packets after they have been scheduled for emission by flow control module 84, but before being written onto an output queue corresponding to its egress interface. Accordingly, to allow flow control module 84 to account for the size of outbound packets after compression, compression module 88 provides, in one implementation, a historical compression ratio characterizing the compression of past packets corresponding to the half-flow in the outbound direction (or the inbound direction depending on the direction in which the packet is transmitted). This historical compression ratio is used in connection with subsequent packets. Multiplying this compression ratio by the size of the packet yields the estimated size of the packet upon egress in the outbound direction. Flow control module 84 uses this estimated packet size in computing bandwidth usage statistics and allocations. In addition, after compression module 88 compresses the packet, it passes the actual compressed size of the packet to flow control module 84 which updates its bandwidth utilization statistics based on the difference, if any, between the actual and estimated packet sizes. In one implementation, compressed packets in the ingress direction are first passed to compression module 88, which strips the tunnel headers and de-compresses the packets. The original packet size prior to de-compression is maintained to allow flow control module 84 to compute bandwidth usage statistics and adjust allocations.

B.4. COMPRESSION AND TUNNELING

Compression module 88 is operative to establish and maintain compression tunnels with compatible routing nodes or other network devices in a communications path. Compression module 88 includes functionality allowing for the establishment and operation of compression tunnels between application traffic management device 30a, for example, and identified tunnel partners along a communications path. In one embodiment, compression module 88 includes data transformation functionality, such as data compression or caching functionality, and tunneling functionality based on standard transport and encapsulation protocols. In one embodiment, compression module 88 includes a variety of compression tunnel capabilities, including the ability to employ different transport and encapsulation protocols, as well as different data compression algorithms.

Compression functionality generally transforms data packets from a first state to a second, smaller state. Compatible de-compression functionality is operative to transform the data from the second smaller state to substantially the first state. For example, according to some algorithms and data formats, de-compression does not recover all of the original data. Transformation functionality may include a variety of types and protocols. For example, compression module 88 may include compression and/or decompression functionality, caching functionality, and encryption and/or decryption functionality, all of a variety of types and configurations. For example, compression module 88 may include a plurality of data compression capabilities, such as compression functionality optimized for different kinds of data (e.g., text files, image files, audio files, etc.). Data transformation can be performed on just the packet data, the header data, or on the entire packet depending on the implementation. In addition, compression module 88 can operate on packets individually, or collect packets and transform them on an aggregate basis. In addition, compression module 88 may operate to transform data from one compression format to another compression format. Suitable compression algorithms include LZ77, LZ78, Lempel-Ziv-Welch (LZW) algorithms.

Compression module 88 is also operative to handle the path between application traffic management device 30a, 30b, 30c and the tunnel partner corresponding to the path, using encapsulation and transport technologies, such as Generic Routing Encapsulation (GRE) protocol (RFC 2890), IP in IP Tunneling protocol (RFC 1853), and/or any other suitable protocol. Compression module 88 also includes tunnel management functionality allowing for maintenance of tunnel state information, as well as recovery functionality that handles loss of tunnels, routing failures and other transmission errors, such as lost or out-of-order packet transmissions (if applicable to the transformation protocol). Compression module 88, as discussed below, is also operative to recognize and handle circumstances where there are multiple paths between two end-systems.

In one embodiment, compression module 88 is operative to probe communication paths for routing nodes or other network devices that include compatible compression and tunneling capabilities. For example, U.S. patent application Ser. No. 10/015,826, incorporated by reference herein, discloses methods for probing a communications path for compatible tunnel partners. Using this technology, application traffic management device 30c (see FIG. 2C), for example, may transmit probe requests along the communications path to end system 42a. As discussed in the above-identified application, application traffic management device 30c processes probe responses to identify an appropriate compression tunnel partner, such as application traffic management device 30a or 30b. In one implementation, the probe response transmitted by application traffic management device 30a or 30b contains information about its partner device to allow the remote application traffic management device 30c to use this information to establish a back-up compression tunnel and/or reconcile possible responses from both application traffic management devices 30a, 30b. Application traffic management devices 30a, 30b may discover the compression capabilities of application traffic management device 30c in a similar manner.

B.4.a. Generation of Probe Requests

Figure 5A:
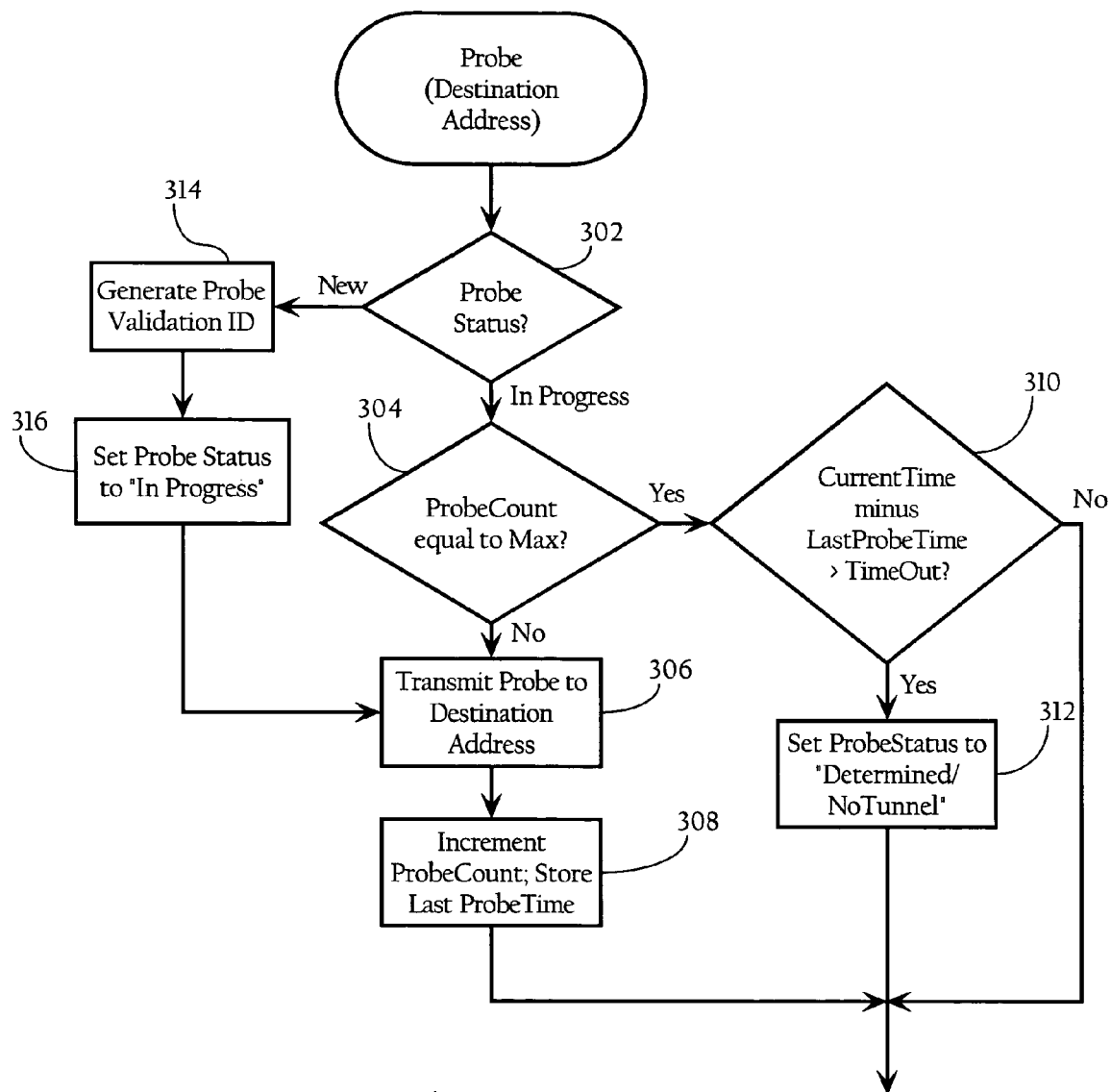
FIG. 5A is a flow chart providing a method associated with the generation and transmission of probe requests.

U.S. patent application Ser. No. 10/015,826 discloses methods for probing communications paths for compatible compression-enabled devices in response to data flows traversing application traffic management device 30c, for example. FIG. 5A sets forth a "Probe" method facilitating the identification of routing nodes or other network devices along a communications path that include compatible compression tunnel capabilities. In one embodiment, when the Probe method is invoked, compression module 88 accesses host database 134 to determine the probe status associated with the destination IP address (FIG. 4, step 302). If the destination IP address has not been probed (e.g., probe status=new), compression module 88 generates a probe request including a probe validation ID for use in subsequent processes described below (step 314). Compression module 88 sets the probe status value associated with the destination IP address to "in progress" (step 316) and transmits the probe request to the destination IP address (step 306). Compression module 88 then increments the probe count parameter and updates the last probe time value associated with the destination IP address in host database 134 (step 308). In one embodiment, compression module 88 further stores the probe validation ID as a probe status parameter in host database 134 in association with the corresponding IP address. As discussed in more detail below, routing nodes and other network devices along the path to the destination IP address include functionality allowing for recognition of probe requests and the formulation and transmission of responses thereto.

If probing of the path to the given destination IP address is "in progress" (step 302), compression module 88 accesses host database 134 to retrieve the number of probes previously sent to the destination IP address. If the probe count parameter is greater than a threshold count (step 304) and the last probe sent has timed out (step 310), compression module 88 sets the probe status parameter for the destination IP address to "determined/no tunnel" (step 312). Otherwise, compression module 88 transmits an additional probe request to the destination IP address (step 306) and updates the probe count and last probe time parameters as appropriate (step 308). In one embodiment, compression module 88 includes the same probe validation ID generated with the first probe request. In another embodiment, compression module 88 generates a new probe validation ID. Probe validation IDs can be any suitable form of identification generated using any suitable technique. For example, a probe validation ID can be a randomly generated number of any suitable length (e.g., 4 octets). In another embodiment, a probe validation ID may also include a time stamp value.

B.4.b. Processing Probe Responses

As discussed above, compatible routing nodes or other network devices along a particular path respond to probe requests transmitted to a destination IP address. FIG. 5B illustrates a method, according to one implementation, for processing probe responses to identify compatible tunneling partners along a communications path. When a probe response is detected, compression module 88 validates the probe response, in one embodiment, by scanning host database 134 for a probe validation ID that matches the probe validation ID contained in the response (step 420). Compression module 88 discards the probe response if the probe validation ID is not found or otherwise invalid (see step 430). Otherwise, compression module 88 then examines the compression tunneling capabilities advertised in the probe response to determine whether they are compatible with its compression tunneling capabilities (step 422). If the responding network device includes compatible compression tunneling capabilities, compression module 88 then accesses host database 134 to determine whether an existing compression tunnel of the same type has been defined for the destination IP address (step 424). If an existing tunnel of the same type has been defined, compression module 88 determines whether the responding network device is further along the path to the destination IP address (step 432). In one embodiment, this determination is performed by comparing the TTL values of the respective probe responses or hop count values derived therefrom (assuming that a uniform TTL value was used by the responding device, see U.S. application Ser. No. 10/015,826). If the responding network device is further along the path, compression module 88 stores tunnel parameters associated with the responding network device in host database 134 and sets the probe status parameter associated with the destination IP address to "determined/tunnel defined" (step 426). In one embodiment, tunnel parameters include the IP address for the end of the tunnel (i.e., the responding network device), and other data associated with the tunnel, such as compression capability(ies), capability type(s), encapsulation protocol (e.g., protocol type, etc.). In one embodiment, compression module 88 then activates the compression tunnel for subsequent data flows (step 428). In one embodiment, compression module 88 determines whether the same compression tunnel already exists for a different destination IP address. Otherwise, compression module 88 uses the tunnel parameters defined above to initialize the transformation tunnel (e.g., IP address, exchanges of keys, reservation of memory, and/or other tunnel initialization operations).

As FIG. 5B illustrates, compression module 88 also determines whether the probe response identifies a partner device (442) and stores the data relating to the partner device (444) for back up or failover purposes. For example, a probe response transmitted by application traffic management device 30a will identify its partner application traffic management device 30b (and potentially its compression tunnel capabilities), and vice versa. Compression module 88 can use this information in a variety of ways. For example, compression module 88 of application traffic management device 30c may use the partner information to establish a backup compression tunnel with application traffic management device 30b. This information may also be used to reconcile probe responses transmitted by application traffic management devices 30a and 30b. In one implementation, the probe request contains information about a partner application traffic management device. For example, the probe requests transmitted by application traffic management device 30b may identify application traffic management device 30a as its partner device.

B.4.c. Re-Probing the Path

As discussed below, compression module 88 also re-probes the communication path to identify the preferred or available tunnel partner. In one implementation, the backup tunnel information is maintained so that, if the active tunnel should go down or become the less preferred route, application traffic management device 30c, for example, can switch over to the backup tunnel. In one implementation, application traffic management device 30c switches between application traffic management device 30a and 30b depending on which device responds to the latest probe request. In one implementation, application traffic management device 30c can re-probe the communications path on a periodic basis (e.g., every minute, or hour). In another implementation, application traffic management device 30c periodically re-probes the communications path to destination hosts or subnets that have been active within a threshold period of time.

FIG. 4 illustrates a method, according to one implementation of the present invention, for re-probing a communications path to identify the preferred tunnel partner from a plurality of redundant, remote tunnel partners. In one implementation, compression module 88, at regular re-probe intervals (502), re-probes the communications paths associated with active destination hosts or subnets. In one implementation, compression module 88, for all remote or outside hosts in host database 134 for which compression tunnels have been activated (504), determines whether the remote host has been active over the previous interval (506). In one implementation, this can be accomplished by inspecting a last packet time field in the host database 134. If the remote host was active, compression module 88 transmits a probe request to the destination host. The information gleaned from the probe response allows application traffic management device 30c, for example, to determine which of the application traffic management devices 30a or 30b is disposed on the preferred route to a given destination host on network 40a. As application traffic management device 30c receives responses to the probe requests, it sets the active compression tunnel to the application traffic management device 30a or 30b that responded to the latest probe request. In other implementations, the selection of a network device. For example, the selection of application traffic management device 30a or 30b may depend on the relative number of probe responses received from the devices, and/or the hop count values contained in the probe responses. In another implementation, application traffic management device 30c, for example, may switch compression tunnel partners for a set of hosts in a subnet after a threshold number of hosts in that subnet were switched to one of the application traffic management devices within a given time interval.

In addition, on re-probing a path to a given destination host, application traffic management device 30c may receive a probe response from the same application traffic management device 30a, for example, but with an updated or new partner (because during the first probe, the application traffic management device 30b might have been inoperable or incorrectly configured). Similarly, the probe requests transmitted by either application traffic management device 30a or 30b may contain, or omit, information about a partner device as the partner device comes on-line or becomes disabled.

In another implementation, the application traffic management device (e.g., application traffic management device 30a) that receives the probe request can copy it over to its partner device (here, application traffic management device 30b) as a special synchronization packet that is not discarded. The partner network device can then respond to the copied probe request with its own IP address and other information, such as compression capabilities. The probing network device (here, application traffic management device 30c) receives probe responses from both of the partner network devices and selects one of them, such as the network device corresponding to the first received probe response. The same process can be applied during re-probes of the communications path to a given host.

B.5. OPERATION

The following illustrates the overall process flow, according to one implementation of the present invention, directed to processing regular and synchronization packets at either of application traffic management devices 30a, 30b. In one implementation, the packet processing differs depending on whether the packet comes out of a compression tunnel. In the inbound direction (i.e., packets received at the outside interface 72), for example, a compressed packet is decompressed before being copied and transmitted on a synchronization interface to a partner application traffic management device. Such an implementation realizes certain efficiencies in that the computational resources required to decompress a given packet is expended only once at the application traffic management device at which the packet was originally received. In addition, such an implementation ensures that the compression dictionaries evolve based on actual network traffic traversing a given application traffic management device 30a, 30b and reduces the problems associated with synchronizing the compression dictionaries due to loss of synchronization packets. In the outbound direction (i.e., packets received at inside interface 71 destined for remote hosts), packets are copied and transmitted on synchronization interfaces and discarded before compression. This implementation, however, may prevent the partner bandwidth management device from obtaining compression statistics necessary to effectively allocate bandwidth and/or compute bandwidth usage. This may throw the compression statistics, as well as bandwidth utilization and allocation statistics, maintained by application traffic management devices 30a, 30b out of synchronization. This circumstance may cause the application traffic management devices 30a, 30b to operate on network traffic in different manners. For example, assume that the active application traffic management device 30a was compressing certain network traffic, for which a 400 Kbps partition was created, at a compression ratio of 2 to 1. Without knowledge of this compression ratio or other compression statistics, the partner application traffic management device 30b (after failover), may start dropping packets corresponding to that partition well before actual bandwidth usage reaches the 400 Kbps limit. As discussed more fully below, by including compression meta data in the synchronization packets, the compression statistics between the application traffic management devices 30a, 30b can be synchronized facilitating concurrent operation and/or failover support.

FIG. 6A illustrates the compression and synchronization functionality implemented by application traffic management devices 30a, 30b. As FIG. 6A illustrates, data packets received at a synchronization interface (202, 204) are decapsulated and flagged as synchronization packets (224). As discussed above, however, synchronization packets can be identified in a variety of manners. For example, in implementations featuring dedicated synchronization interfaces, synchronization packets are identified as such merely by being received at a synchronization interface. Synchronization packets can also be identified based on the format of the incoming packet, such as the presence of over-writing meta data, encapsulating headers, and the like. In one implementation, packet processor 82 adjusts various packet parameters such as a packet size based on the compression statistics and other meta data appended to the synchronization packets (225). In other implementations, the compression statistics appended to a given synchronization packet can be passed to flow control module 84 to adjust flow control parameters, such as the bandwidth utilization measurements associated with a given partition, traffic class, and/or data flow.

Synchronization packets are then processed just as regular packets, except as discussed herein (226). For example, and in one implementation, packet processor 82 creates or updates entries in host database 134 and flow database 135. Traffic classification engine 86 operates on the packet to identify a traffic class and potentially bandwidth utilization controls to be applied to the packet. Flow control module 84 then operates on the packet and schedules its emission from application traffic management device 30a. Packet processing operations (226) also identify whether the packet is to be compressed and tunneled to a remote network device, such as application traffic management device 30c. As discussed above, flow control module 84 uses historical compression ratios to compute the estimated size of the packet after compression in computing bandwidth allocation and scheduling decisions. As FIG. 6A shows, after processing, if the packet is flagged as a synchronization packet (228) however, it is discarded (230). Otherwise, the packet is emitted (236). Furthermore, outbound packets to be compressed (232) are passed to compression module 88 which compresses the packet, encapsulates the packet (234), and computes and passes compression statistics back to flow control module 84 (235) for feedback purposes, such as updating bandwidth usage statistics (see above).

As FIG. 6A shows, packets received at inside and outside interfaces 71, 72 are copied and encapsulated as synchronization packets (208) and transmitted to a partner application traffic management device (210). Incoming packets (244) that have been compressed and tunneled, however, are first passed to compression module 88. In one implementation, incoming tunnel packets are identified based on the destination IP address matching the IP address of the application traffic management device 30a, 30b. Compression module 88 de-capsulates the packets by stripping the tunnel headers and decompresses the tunnel packet payload (246). Compression module 88 also computes compression statistics based on the size of the packet both before and after de-compression (248). In addition, compression module 88 also computes compression statistics for outbound packets that, in one implementation, are transmitted on a synchronization interface to a partner network device. In the outbound direction, the compression meta data appended to the synchronization packet, in one implementation, is the historical compression ratio discussed above. As discussed more fully below, other compression statistics can be appended to the packet in addition to, or in lieu of, the compression ratio. The compression statistics are included in the synchronization packets and used to adjust the operation of the flow control modules of the partner application traffic management devices 30a, 30b and to otherwise synchronization their operation. For example, as to outbound synchronization packets, flow control module 84 on the receiving network device can use the historical compression ratio associated with the packet and the packet size to compute the size of the packet after compression.

B.5.a. Compression Meta Data

In one implementation, since inbound packets are decompressed before being transmitted over a synchronization interface, the compression statistics for the packet are based on the size of the packet before and after de-compression. In one implementation, the compression statistics are appended to each packet. In one implementation, the compression statistic is the compression ratio. In another implementation, the compression statistic is the difference in size between the packet before and after compression. In the outbound direction, a predicted or estimated compression statistic, in one implementation, is appended to the synchronization packet, as it is transmitted before the actual compression statistics are known. In one implementation, compression module 88 maintains a weighted moving average of the compression ratio in the outbound direction for each data flow. This compression ratio corresponding to a given flow, in one implementation, is appended to the synchronization packet (e.g., included in a header field) and can be used to compute the correct bandwidth utilization and allocation parameters at the partner device.

In another implementation, a packet fix-up value is computed based on the past compression activity instead of a predicted or estimated compression ratio or packet size. In one implementation, the fix-up value is based on the real compression experience with past packets corresponding to a given data flow. Compression module 88, in one implementation, maintains a flow fix-up value or counter (flow.fixup). After transmission of an outgoing tunnel packet, compression module 88 computes flow.fixup, which equals the difference between the original and transmitted size of the packet.

flow.fixup=flow.fixup+TransmittedSize−OriginalSize

In the incoming direction, a similar fixup value can be employed.

flow.fixup=flow.fixup+Received Size−Original Size

When a synchronization packet for an outgoing or incoming tunnel packet is transmitted, a packet fix-up value (packet.fixup) is appended to the packet and the flow.fixup value is reset.

packet.fixup=flow.fixup;

flow.fixup=0;

The partner application traffic management device 30b, for example, can use the size of the received synchronization packet and the packet.fixup value in bandwidth usage and/or allocation computations.

Still further, while the implementations described above include compression meta data for the compression associated with one interface, in other implementations, network traffic may be decompressed on ingress into application traffic management device 30a, 30b and recompressed for a different link or compression tunnel on egress. In such an implementation, two fix-up values or compression ratios are required—one for ingress and one for egress—for the synchronization packets.

In another implementation, a fix-up value is transmitted after the original, compressed packet has been transmitted. For example, assuming a historical compression ratio of 50 percent, the estimated size of a 1500-byte packet, after compression is 750 bytes. The actual compressed size, however, can be 800 bytes, for example. The difference can be sent in the next packet associated with either the flow, the same traffic class, or the same direction in an additional field in the synchronization packet. In another implementation, the 50-byte difference can be used to adjust the estimated size of the next packet. For example, assume that a second 1500-byte packet corresponding to the same flow is received. Assuming a compression ratio of 49% for example, the estimated size of the packet after compression would be 765. To account for the 50-byte difference, the reported size of the synchronization packet would be 815 bytes. In one implementation, the possibility of negative values is addressed by preventing the packet fix-up value from being greater than the size of the current synchronization packet with any remaining fix-up value possibly being applied to a subsequent synchronization packet associated with the a given flow.

B.5.b. Magic Numbers

FIG. 7 illustrates, for didactic purposes, a method directed to an implementation of the network traffic synchronization functionality that uses magic numbers to identify configuration errors, such as where the synchronization interface is physically connected to the wrong port of a partner application traffic management device or an entirely incorrect network device. As discussed herein, synchronization packets, in one embodiment, include magic numbers or other identifiers allowing for verification that the packets received are in fact synchronization packets from a partner network device. In one embodiment, the network device maintains a connection state which is set to OK if synchronization packets contain the appropriate magic identifier. Otherwise, a bad connection state flag is set to indicate a configuration error.

As FIG. 7 illustrates, assuming the connection state is OK (206), packets received at non-synchronization network interfaces (202, 204) are copied and, in one embodiment, encapsulated with a synchronization header identifying the network interface at which the packet was received (208). The encapsulated packet is then transmitted to a partner network device (210). If the bad connection state flag is set (206), no synchronization packets are copied and/or transmitted. As discussed below, the synchronization packets can be summarized versions of the original packets to, for example, conserve bandwidth. For example, in embodiments where only the packet headers are of interest, the payloads can be replaced with summary information such as payload size and any other relevant information. On the receiving end (see below), the summary information can be used to reconstruct versions of the packets before processing.

Packets received at a synchronization network interface (204), on the other hand, are verified, in one embodiment, using the magic number or other identifier appended to or overwritten into the packet (212). If the magic number is incorrect or not contained in the packet and the connection state flag has not been previously set (214), a configuration error is reported (216) and the bad connection state flag is set (218). In one embodiment, the packet is also discarded (119). In one embodiment, the configuration error is reported in an email to a network administrator. The configuration error may also reported in an SNMP trap or other suitable message to a network management platform. If the bad connection state flag has been previously set (214), the packet is discarded (219).

If the magic number is verified, the network device decapsulates and flags the packet as a synchronization packet (224). In addition, if the synchronization packet is a summary of the original packet, the packet is reconstructed using the summary information. For example, if the summary information indicates that the original packet had a 1300-byte payload, the packet is reconstructed to have a dummy payload of 1300 bytes. As FIG. 7 illustrates, the network device processes the packet, in one embodiment, as if it were a regular packet received at a non-synchronization network interface (226).

In another embodiment, whether the configuration errors are explicitly reported to a network administrator in an email, for example, is a configurable option. If the reporting option is not set, packets not including the requisite magic identifier can be simply discarded. In this instance, the network administrator can check for configuration errors by examining the MIB 138 which includes a variable that indicates the number of synchronization packets discarded on the interface 74. If the value is non-zero, a configuration error is likely.

B.5.c. Alternative Implementation—Shadow Compression Dictionary

In another implementation, compression module 88 maintains a shadow dictionary for every active dictionary maintained by its partner application traffic management device that is used to compress network traffic. In one embodiment, the shadow compression dictionary is developed by having compression module 88 operate on flagged, outbound synchronization packets and discarding the packets prior to emission. In this manner, compression module 88 can compute its own compression statistics and provide these compression statistics to rate control module 84, as discussed above. In another implementation, the compression module 88 could also operate to develop a shadow dictionary in the inbound direction by receiving inbound synchronization packets before they are decompressed.

In another implementation, compression module 88 can operate to compress outbound packets to compute the actual compression statistics for a given packet. The original, uncompressed packet, however, can be transmitted as a synchronization packet to the partner network device, along with the actual compression statistics computed by the compression module 88. In addition, the compression module 88 would then compress the packet again, or withhold emission of the compressed packet, until the synchronization packet has been transmitted.

FIG. 6B illustrates a process flow according to the "shadow dictionary" implementation described above. The process flow illustrated in FIG. 6B, in one implementation, is substantially similar to the process flow of FIG. 6A. After processing of the packet (226), however, outbound tunnel packets (732) are passed to compression module 88. Compression module 88 checks the status of the synchronization flag. If the packet is a synchronization packet (734), compression module 88 compresses the packet using a shadow dictionary (736) and passes the compression statistics to flow control module 84 (235). Otherwise, compression module 88 operates as discussed above to compress the packet, using and developing a regular compression dictionary (234).

B.6. CONCLUSION

Lastly, although the present invention has been described as operating in connection with end systems and networks employing the HTTP, UDP, TCP and IP protocols, the present invention has application in computer network environments employing any suitable session layer, transport layer and network layer protocols. Moreover, while embodiments of the present invention have been described as operating in connection with application traffic management devices, the present invention can also operate in connection with other network devices that include compression functionality. Furthermore, the network devices at each end of the compression tunnel need not include identical functionality. For example, application traffic management device 30c can be replaced with a network device that only performs data compression, or performs some other network function such as a proxy server. While the embodiments described above include compression tunnels between application traffic management device 30c and devices 30a, 30b, respectively, compression tunnels can also be maintained at other interfaces as well.

In addition, white the embodiments described above, exchange entire packets to synchronize network traffic data, partner network devices, in other embodiments, may exchange distilled versions of the packets or data characterizing selected attributes of the packets. Still further, while the embodiments described above copy and transmit synchronization packets upon receipt at a given network interface, the synchronization packets may be sent after the corresponding regular packets have been processed by the control module or other functionality. In addition, the deployment of the network devices 30a, 30b behind routers 22a, 22b is only one possible deployment configuration. Other deployment scenarios are possible. Stilt further, while the embodiments described above include a pair of interfaces for inside and outside network traffic, the present invention can be applied to a network device including additional network interfaces. In such an embodiment, the synchronization packets identify the network interface at which the original packet was received as described above. Still further, while the embodiment described in FIG. 2C shows a single application traffic management device 30c disposed at one end of a communications path, redundant network devices may deployed at this end. In such an embodiment, application traffic management devices 30a, 30b may also be configured to re-probe for the preferred device at that end of the communications path, as discussed above. Stilt further, the synchronization functionality according to the present invention may be deployed on network devices that include a single network interface. Accordingly, the present invention has been described with reference to specific embodiments. Other embodiments of the present invention will be apparent to one of ordinary skill in the art. It is, therefore, intended that the claims set forth below not be limited to the embodiments described above.

What is claimed is:

1. An apparatus enabling synchronization of network traffic with at least one compression-enabled network device, comprising
    at least one network interface;
    a compression module operative to
        compress outgoing packets;
        de-compress incoming packets; and compute compression statistics related to the compressed and de-compressed packets, wherein the compression statistics includes at least a packet compression ratio or a packet size difference before and after compression;

a packet processor operative to receive packets on the at least one network interface;

receive synchronization packets from at least one partner network device, wherein at least one synchronization packet includes compression statistics computed by the partner network device;

transmit the packets received on the at least one network interface as synchronization packets to the partner network device, wherein at least one synchronization packet transmitted on the at least one network interface includes a compression statistic computed by the compression module.

2. An apparatus enabling synchronization of network traffic with at least one compression-enabled network device, comprising at least one network interface;

a compression module operative to compress outgoing packets;

de-compress incoming packets; and compute compression statistics related to the compressed and de-compressed packets;

a packet processor operative to receive packets on the at least one network interface;

receive synchronization packets from at least one partner network device, wherein at least one synchronization packet includes compression statistics computed by the partner network device;

transmit the packets received on the at least one network interface as synchronization packets to the partner network device;

wherein at least one synchronization packet transmitted on the at least one network interface includes a compression statistic computed by the compression module; and a flow control module operative to allocate bandwidth to packets based at least in part on the compression statistics associated with the packets.

3. An apparatus enabling synchronization of network traffic with at least one compression-enabled network device, comprising at least one network interface;

a compression module operative to compress outgoing packets;

de-compress incoming packets; and compute compression statistics related to the compressed and de-compressed packets; and a packet processor operative to receive packets on the at least one network interface;

receive synchronization packets from at least one partner network device, wherein at least one synchronization packet includes compression statistics computed by the partner network device;

transmit the packets received on the at least one network interface as synchronization packets to the partner network device, wherein at least one synchronization packet transmitted on the at least one network interface includes a compression statistic computed by the compression module; and discard the received synchronization packets.

4. An apparatus enabling synchronization of network traffic with at least one compression-enabled network device, comprising a first network interface for communication with a first network device;

a second network interface for communication with a second network device;

at least a third network interface for exchange of synchronization packets with a partner network device;

a compression module operative to compress outbound packets received at the first network interface;

de-compress inbound packets received at the second network interface; and compute compression statistics related to the compressed and de-compressed packets;

a packet processor operative to receive packets on the first and second network interfaces, wherein the data packets are addressed to destination hosts;

receive synchronization packets on the at least a third network interface, wherein at least one synchronization packet includes compression statistics computed by a partner network device;

transmit, on the at least a third network interface, the packets received on the first network interface as synchronization packets to the partner network device, transmit, on the at least a third network interface, the packets received on the second network interface as synchronization packets to the partner network device;

wherein at least one synchronization packet transmitted on the at least a third network interface includes a compression statistic computed by the compression module; and a flow control module operative to allocate bandwidth to packets based at least in part on the compression statistics associated with the packets.

5. An apparatus enabling synchronization of network traffic with at least one compression-enabled network device, comprising a first network interface for communication with a first network device;

a second network interface for communication with a second network device;

at least a third network interface for exchange of synchronization packets with a partner network device;

a compression module operative to compress outbound packets received at the first network interface;

de-compress inbound packets received at the second network interface; and compute compression statistics related to the compressed and de-compressed packets;

a packet processor operative to receive packets on the first and second network interfaces, wherein the packets are addressed to destination hosts;

receive synchronization packets on the at least a third network interface, wherein at least one synchronization packet includes compression statistics computed by a partner network device;

transmit, on the at least a third network interface, the packets received on the first network interface as synchronization packets to the partner network device; and transmit, on the at least a third network interface, the packets received on the second network interface as synchronization packets to the partner network device, wherein at least one synchronization packet transmitted on the at least a third network interface includes a compression statistic computed by the compression module;

a flow control module operative to allocate bandwidth to packets based at least in part on the compression statistics associated with the packets; and a tunnel probing module operative to dynamically probe a communications path to a destination host for at least one network device having compression capabilities; and establish a compression tunnel with an identified network device in the communications path.

6. The apparatus of claim 5 wherein the tunnel probing module is operative to transmit probe requests along the communications path to the destination host; and receive probe responses from network devices in the communications path to the destination host.

7. The apparatus of claim 6 wherein at least one probe response identifies a partner network device; and wherein the tunnel probing module is operative to establish a back up tunnel with the partner network device.

8. The apparatus of claim 6 wherein the tunnel probing module is further operative to receive a probe request from a network device in the communications path between a source host and a destination host;

respond to the probe request by transmitting a probe response;

copy the probe request to a partner network device.

9. An apparatus enabling synchronization of network traffic with at least one compression-enabled network device, comprising a first network interface for communication with a first network device;

a second network interface for communication with a second network device;

at least a third network interface for exchange of synchronization packets with a partner network device;

a compression module operative to compress outbound packets received at the first network interface;

de-compress inbound packets received at the second network interface; and compute compression statistics related to the compressed and de-compressed packets;

a packet processor operative to receive packets on the first and second network interfaces, wherein the packets are addressed to destination hosts;

receive synchronization packets on the at least a third network interface, wherein at least one synchronization packet includes compression statistics computed by a partner network device;

discard the received synchronization packets;

transmit, on the at least a third network interface, the packets received on the first network interface as synchronization packets to the partner network device; and transmit, on the at least a third network interface, the packets received on the second network interface as synchronization packets to the partner network device;

wherein at least one synchronization packet transmitted on the at least a third network interface includes a compression statistic computed by the compression module; and a flow control module operative to allocate bandwidth to packets based at least in part on the compression statistics associated with the packets.

10. An apparatus enabling synchronization of network traffic with at least one compression-enabled network device, comprising a first network interface for communication with a first network device;

a second network interface for communication with a second network device;

a third network interface for exchange of synchronization packets with a partner network device;

a fourth network interface for exchange of synchronization packets with the partner network device;

a compression module operative to compress outbound packets received at the first network interface;

de-compress inbound packets received at the second network interface; and compute compression statistics related to the compressed and de-compressed packets;

a packet processor operative to receive packets on the first and second network interfaces, wherein the packets are addressed to destination hosts;

receive synchronization packets on the at least a third network interface, wherein at least one synchronization packet includes compression statistics computed by a partner network device;

transmit, on the at least a third network interface, the packets received on the first network interface as synchronization packets to the partner network device;

transmit, on the at least a third network interface, the packets received on the second network interface as synchronization packets to the partner network device;

transmit, on the third network interface, the data packets received on the first network interface as synchronization packets to the partner network device; and transmit, on the fourth network interface, the data packets received on the second network interface as synchronization packets to the partner network device;

wherein at least one synchronization packet transmitted on the at least a third network interface includes a compression statistic computed by the compression module; and a flow control module operative to allocate bandwidth to packets based at least in part on the compression statistics associated with the packets.

11. An apparatus enabling synchronization of network traffic with at least one compression-enabled network device, comprising a first network interface for communication with a first network device;

a second network interface for communication with a second network device;

at least a third network interface for exchange of synchronization packets with a partner network device;

a compression module operative to compress outbound packets received at the first network interface;

de-compress inbound packets received at the second network interface; and compute compression statistics related to the compressed and de-compressed packets;
a packet processor operative to
receive packets on the first and second network interfaces, wherein the packets are addressed to destination hosts;
receive synchronization packets on the at least a third network interface, wherein at least one synchronization packet includes compression statistics computed by a partner network device;
encapsulate the packets received on the first and second network interfaces with synchronization headers before transmitting the packets on the at least a third network interface;
transmit, on the at least a third network interface, the packets received on the first network interface as synchronization packets to the partner network device;
transmit, on the at least a third network interface, the packets received on the second network interface as synchronization packets to the partner network device; and
decapsulate the synchronization packets received on the at least a third network interface network interface;
wherein at least one synchronization packet transmitted on the at least a third network interface includes a compression statistic computed by the compression module; and
a flow control module operative to allocate bandwidth to packets based at least in part on the compression statistics associated with the packets.

12. The apparatus of claim 11 wherein the control module is further operative to
include meta information relating to the data packets in the synchronization header.

13. The apparatus of claim 4 wherein the first network interface is a wired network interface.

14. The apparatus of claim 4 wherein the first network interface is a wireless network interface.

15. The apparatus of claim 4 wherein the at least a third network interface is a wireless network interface.

16. The apparatus of claim 8 wherein the fourth network interface is a wireless network interface.

17. The apparatus of claim 4 wherein the packet processor is further operative to verify the packets received on the at least a third network interface.

18. The apparatus of claim 17 wherein the synchronization packets include a magic identifier, and wherein the packet processor is operative to verify the packets received on the at least a third network interface by validating the magic identifier.

19. The apparatus of claim 17 wherein the control module is further operative to include magic identifiers to synchronization packets transmitted on the at least a third network interface.

20. An apparatus enabling synchronization of network traffic with at least one compression-enabled network device, comprising
a first network interface for communication with a first network device;
a second network interface for communication with a second network device;
at least a third network interface for exchange of synchronization packets with a partner network device;
a compression module operative to
compress outbound packets received at the first network interface;
de-compress inbound packets received at the second network interface; and
compute compression statistics related to the compressed and de-compressed packets;
a packet processor operative to
receive packets on the first and second network interfaces, wherein the data packets are addressed to destination hosts;
receive synchronization packets on the at least a third network interface, wherein at least one synchronization packet includes compression statistics computed by a partner network device;
transmit, on the at least a third network interface, the packets received on the first network interface as synchronization packets to the partner network device;
transmit, on the at least a third network interface, the packets received on the second network interface as synchronization packets to the partner network device, wherein at least one synchronization packet transmitted on the at least a third network interface includes a compression statistic computed by the compression module; and
compose summary versions of the packets received on the first and second network interfaces and transmit the summary versions as synchronization packets on the at least a third network interface; and
a flow control module operative to allocate bandwidth to packets based at least in part on the compression statistics associated with the packets.

21. The apparatus of claim 20 wherein the summary versions each comprise a packet header and a payload size.

22. The apparatus of claim 4 wherein the compression statistics comprise a compression ratio.

23. The apparatus of claim 4 wherein the compression statistics comprise the size difference between at least one uncompressed packet and the corresponding compressed packet.

24. The apparatus of claim 4 wherein the compression statistics comprise the size difference between at least one compressed packet and the corresponding de-compressed packet.

25. In a computer network environment including a first network comprising a plurality of remote hosts and at least first and second redundant compression devices disposed in the communications paths between the remote hosts and a second network, a method comprising
identifying at least first and second redundant compression devices in communications paths between a second network and the remote hosts of the first network;
tunneling data flows associated with a given remote host to a selected compression device from the identified redundant compression devices;
probing the communications paths to a first remote host of the first network for the at least first and second redundant compression devices; and
selecting, for the first remote host, one of the at least first and second redundant compression devices based on the results of the probing step.

26. The method of claim 25 further comprising
repeating the probing and selecting step for a desired number of remote hosts of the first network.

27. The method of claim 25 further comprising
selecting, for at least a second remote host of the first network, one of the at least first and second redundant compression devices based on the results of the probing step.

28. The method of claim 25 wherein the probing step comprises
    transmitting probe requests to the remote hosts; and
    receiving probe responses from one of the at least first and second redundant compression devices in the communications paths to the remote hosts.

29. The method of claim 28 wherein at least one probe response identifies a partner compression device.

30. A method facilitating the synchronization of network traffic with at least one compression-enabled network device, comprising
    receiving, at a network device, tunnel packets addressed to the network device on a first network interface;
    receiving, at the network device, packets addressed to destination hosts on the second network interface;
    receiving synchronization packets from at least one partner network device;
    decompressing tunnel packets received at the first network interface and transmitting the decompressed data packets received on the first network interface as synchronization packets to at least one partner network device, wherein the synchronization packet includes compressing statistics relating to the decompressing step;
    transmitting the packets received on the second network interface as synchronization packets to the at least one partner network device;
    processing the packets received on the first and second network interfaces, and the synchronization packets; and
    discarding the synchronization packets.

31. The method of claim 30 further comprising
    compressing outbound tunnel packets received at the second network interface and transmitting them from the first network interface.

32. The method of claim 30 further comprising
    transmitting, after the decompressing step, tunnel packets received at the first network interface from the second network interface.

33. The method of claim 30 wherein the synchronization packets are transmitted and received on the first network interface.

34. The method of claim 30 wherein the synchronization packets are transmitted and received on at least a third network interface.

35. The method of claim 30 wherein the synchronization packets include a VLAN identifier associated with the network interface on which the corresponding packet was received.

36. The method of claim 30 wherein the synchronization packets include an MPLS tag identifying the network interface on which the corresponding packet was received.

37. An apparatus enabling synchronization of network traffic with at least one compression-enabled network device, comprising
    a first network interface for communication with a first network device;
    a second network interface for communication with a second network device;
    at least a third network interface for exchange of synchronization packets with a partner network device;
    a packet processor operative to
        process data packets on the first and second network interfaces, wherein the data packets are addressed to destination hosts;
        process synchronization packets on the at least a third network interface, wherein at least one synchronization packet includes compression statistics computed by a partner network device;
        transmit, on the at least a third network interface, the data packets received on the first network interface as synchronization packets to the partner network device,
        transmit, on the at least a third network interface, the data packets received on the second network interface as synchronization packets to the partner network device; and
    a compression module operative to
        compress outbound data packets received at the first network interface and outbound synchronization packets received at the at least a third network interface;
        de-compress inbound data packets received at the second network interface;
        compute compression statistics related to the compressed and de-compressed packets; and
        maintain a shadow dictionary for compression operations associated with synchronization packets received at the at least a third network interface; and
    a flow control module operative to allocate bandwidth to packets based at least in part on the compression statistics associated with the packets.

38. The apparatus of claim 37 wherein the compression module is operative to de-compress inbound synchronization packets received at the at least a third network interface.

39. The apparatus of claim 37 wherein the apparatus is operative to decompress inbound data packets received at the second network interface and transmit the decompressed inbound data packets to the partner network device.

40. An apparatus enabling synchronization of network traffic with at least one compression-enabled partner network device, comprising
    a first network interface;
    a second network interface;
    at least a third network interface for exchange of synchronization packets with a partner network device;
    a compression module operative to
        maintain a compression tunnel with a compression-enabled network device;
        compute inbound compression statistics for inbound packets;
        compute outbound compression statistics for outbound packets; and
    a packet processor operative to
        receive inbound packets on the first network interface,
        identify compressed inbound packets received on the first network interface and pass the compressed inbound packets to the compression module;
        receive decompressed inbound packets from the compression module;
        transmit, on the at least a third network interface, decompressed inbound data packets received on the first network interface as inbound synchronization packets to the partner network device, wherein the inbound synchronization packets include inbound compression statistics computed by the compression module;
        receive outbound packets on the second network interface,
        identify outbound packets corresponding to a compression tunnel and pass the identified outbound packets to the compression module;
        transmit, on the at least a third network interface, the outbound packets received on the second network interface as outbound synchronization packets to the partner network device, wherein the outbound synchronization packets include outbound compression statistics computed by the compression module;

receive inbound synchronization packets on the at least a third network interface from at least one partner network device, wherein at least one of the inbound synchronization packets include an inbound compression statistic computed by a partner network device; and receive outbound synchronization packets on the at least a third network interface from the at least on partner network device, wherein at least one of the outbound synchronization packets include an outbound compression statistic computed by a partner network device.

41. The apparatus of claim 40 further comprising a flow control module operative to allocate inbound bandwidth to inbound packets and inbound synchronization packets based in part on the inbound compression statistics corresponding to the inbound packets and inbound synchronization packets; and allocate outbound bandwidth to outbound packets and outbound synchronization packets based in part on the outbound compression statistics corresponding to the outbound packets and outbound synchronization packets.

42. The apparatus of claim 40 wherein the inbound compression statistics characterize the difference between at least one compressed packet and the corresponding decompressed packet.

43. The apparatus of claim 40 wherein the inbound compression statistics are compression ratios characterizing the difference between at least one compressed inbound packet and the corresponding decompressed inbound packet.

44. The apparatus of claim 40 wherein the outbound compression statistics are, relative to a given outbound packet, an estimated compression statistic.

45. The apparatus of claim 40 wherein the outbound compression statistics are weighted moving averages of the compression ratio in the outbound direction for each data flow.

46. The apparatus of claim 40 wherein the outbound compression statistics are packet fix up values characterizing the difference between the estimated compressed size of an outbound packet and the actually compressed size of the outbound packet.

47. The apparatus of claim 40 wherein the outbound compression statistics are packet fix up values characterizing the difference between the estimated compressed size of a previous outbound packet and the actually compressed size of the previous outbound packet.

48. The apparatus of claim 47 wherein the outbound compression statistics further include the estimated compressed size of a corresponding outbound packet.

49. The apparatus of claim 1 wherein the compression statistic included in a synchronization packet characterizes compression or de-compression of a packet corresponding to the synchronization packet.

50. The apparatus of claim 4 wherein the compression statistic included in a synchronization packet characterizes compression or de-compression of a packet corresponding to the synchronization packet.

\* \* \* \* \*